US005497412A

United States Patent [19]
Lannen et al.

[11] Patent Number: 5,497,412
[45] Date of Patent: Mar. 5, 1996

[54] ENHANCED CALL DELIVERY SYSTEM FOR ROAMING CELLULAR SUBSCRIBERS

[75] Inventors: Margaret Lannen; Kenneth W. Hammer, both of Tampa; Edward L. Didion, Brandon, all of Fla.

[73] Assignee: GTE Telecommunication Services Incorporated, Tampa, Fla.

[21] Appl. No.: 224,457

[22] Filed: Apr. 7, 1994

[51] Int. Cl.$^6$ ............................................. H04Q 7/22
[52] U.S. Cl. .............................. 379/60; 379/59; 455/33.1; 455/33.2
[58] Field of Search ................................ 379/58, 59, 60, 379/63; 455/33.1, 33.2, 54.1, 54.2, 56.1

[56] References Cited

U.S. PATENT DOCUMENTS

| | | | |
|---|---|---|---|
| 4,901,340 | 2/1990 | Parker et al. | 379/60 |
| 5,142,654 | 8/1992 | Sonberg et al. | 379/59 |
| 5,282,250 | 1/1994 | Dent et al. | 379/59 X |
| 5,341,410 | 8/1994 | Aron et al. | 379/59 |
| 5,345,595 | 9/1994 | Johnson et al. | 455/33.1 |

OTHER PUBLICATIONS

EIA/TIA Standard 553, Mobile Station–Land Station Compatibility Specification, Sep. 1989.
EIA/TIA Interim Standard IS–41 –REV.A., Cellular Radiotelecommunications Intersystem Operation, Jan. 1991.

*Primary Examiner*—Curtis Kuntz
*Assistant Examiner*—Michael B. Chernoff
*Attorney, Agent, or Firm*—James J. Cannon, Jr.

[57] ABSTRACT

A system for enhanced call delivery to a roaming cellular subscriber, enabling said subscriber to receive calls placed to his MIN in his home system service area, utilizes a central telecommunications system processor capable of handling network applications, directly connected to a plurality of mobile telephone switches located in the service areas of a plurality of cellular telephone systems, each of said switches connected via a direct communication link to said central telecommunications system processor. A plurality of registers in said central telecommunications system processor are provided for storing data bases of system information, individual switch information, and subscriber information. The central telecommunications system processor is programmed to communicate with said switches, and to provide to the switches of the home and visited service areas of a roaming cellular subscriber: (1) making the identity of the current visited system switch of a roaming cellular subscriber known to his home system; (2) establishing financial responsibility of the roaming cellular subscriber; (3) establishing a valid roamer service profile in a visited system; and (4) setting up call delivery to a validated roaming cellular subscriber in the service area of a visited switch. The system further includes a general location register in said central telecommunications system processor containing a data base of all information necessary for validating and locating of known roamers, and a data base of routing information for location of home carriers, whereby end-to-end validation and registration is accomplished for previously unknown roamers. The system provides call delivery information to the home switch of a roamer, routing information for forwarding calls to said roamer; and a temporary directory number as needed for forwarding calls to said roamer over the Public Switched Telephone Network (PSTN).

4 Claims, 18 Drawing Sheets

ENHANCED CALL DELIVERY SYSTEM FOR ROAMING CELLULAR SUBSCRIBERS

BACKGROUND OF THE INVENTION

1. Field of the Invention

The present invention relates to cellular telephone communication systems, and more particularly to a system and method that provides for enhanced transparent call delivery to roaming subscribers of cellular telephone services and the interoperability of differing call delivery systems and communications among mobile telephone switching offices.

2. Description of the Prior Art

Cellular telephone service is widely available, and the operational capabilities of the systems, switching equipment and computer software utilized to provide cellular telephone service are well known and documented. The product literature of companies selling cellular switches and cellular software is readily available and contains full descriptions of the equipment and software capabilities available today. U.S. Pat. No. 4,901,340, System for the Extended Provision of Cellular Mobile Radiotelephone Service, Parker et al, issued Feb. 13, 1990, discloses a system for call delivery to a cellular telephone service subscriber who has roamed outside the service area of the home cellular system, utilizing a temporary local directory number and a call delivery processor functioning at each mobile telephone switch site. U.S. Pat. No. 5,142,654, Cellular Telephone System And Method For Dynamically Switching Between Call Routing Options, Sonberg et al, issued Aug. 25, 1992, discloses a system and method that provides for dynamic switching between call handling options such as caller notification and call forwarding. U.S. Pat. No. 5,282,240, Apparatus and Method for Directing Calls to Mobile Station Subscribers, Buhl et al, discloses a page first system. U.S. Pat. No. 5,282,250, Method of Carrying Out an Authentication Check Between a Base Station and a Mobile Station in a Mobile Radio System, Dent et al, discloses a pre-call validation system.

The systems for call delivery disclosed in the first two referenced patents are available to cellular telephone systems operators and, through said operators, to cellular subscribers under the trade names and trademarks Follow Me Roaming®, Phone Me Anywhere®, for the system of the Parker et al patent operated by GTE Telecommunications Services Incorporated (GTE TSI), and NationLink® and RoamAmerica® for the system of the Sonberg patent operated by Electronic Data Systems (EDS). The Follow Me Roaming® system is the most widely used and will be designated hereinafter as the FMR system.

Essential to the prior art call delivery systems is that each mobile telephone switching office (MTSO) has its own computer system, or site processor, for setting up fixed delivery of calls to a roaming cellular subscriber. Most of these individual computer systems communicate with a host processor at a clearinghouse operated by GTE EDS.

The Electronic Industries Association (EIA) and the Telecommunications Industry Association (TIA) have published a number of joint standards which pertain to cellular service and which are incorporated herein by reference. EIA/TIA Standard 533, Mobile Station—Land Station Compatibility Specification, applies to the system of this invention. The EIA/TIA Subcommittee TR45.2 has published a series of recommendations entitled Cellular Radiotelecommunications Intersystem Operations, which describe procedures necessary to provide cellular telephone service requiring interaction between different cellular systems and dissimilar switch types. Interim Standard IS-41, Rev. A, (hereinafter "Rev. A"), of said series Cellular Radiotelecommunications Intersystem Operations is currently being implemented at the time of filing of this Application. Further standards (Rev. B and C) have been announced for future implementation. Neither of the prior art call delivery systems conform to IS-41 Rev. A.

The present invention is directed to an enhanced version of the FMR system of Parker et al, hereinafter FMR Plus, whereby not only are the requirements of each increment of IS-41 met as required, but they are met faster and more efficiently utilizing one central computer, or host processor, serving a multiplicity of Mobile Telephone Switching Offices (MTSOs), eliminating the site processors, while having the capability of interoperability with the older FMR system and IS-41 Rev. A systems using X.25 or Signaling System 7 (SS7) transport. FMR Plus implements IS-41 Rev. A automatic roaming, which includes making the identity of the visited system known to the home system (automatic registration), transparent call delivery to the roaming subscriber, and allowing the roamer's service profile features to be changed remotely.

The principal object of the present invention is to provide a cellular call delivery system for automatically delivering calls to roaming cellular subscribers meeting the standards of IS-41 Rev. A while maintaining connectivity with non-IS-41 systems.

It is a further object of the invention to provide an enhanced cellular call delivery system utilizing IS-41 Rev. A with seamless interoperability among Mobile Switching Centers utilizing IS-41 Rev. A via a single switch connection, between MSCs using IS-41 and MSCs which have not implemented IS-41, and the provision of connectivity via the FMR host processor to FMR site processors which reside at cellular switches which have not implemented IS-41, Rev. A.

It is still a further object of this invention to provide an input/output gateway between the FMR host processor and the FMR Plus host processor, enabling message translation between the two systems.

Other objects, features and advantages of the invention will become apparent by reading the enclosed specification with the accompanying drawings.

SUMMARY OF THE INVENTION

In a first aspect of the invention, a system for enhanced call delivery to a roaming cellular subscriber, enabling said subscriber to receive calls placed to his MIN in his home system service area, comprises a central telecommunications system processor capable of handling network applications, directly connected to a plurality of mobile telephone switches located in the service areas of a plurality of cellular telephone systems. A plurality of registers in said central telecommunications system processor are provided for storing data bases of system information, individual switch information, and subscriber information. The central telecommunications system processor is programmed to communicate with said switches, and to provide to the switches of the home and visited service areas of a roaming cellular subscriber: (1 the identity of the current visited system switch of a roaming cellular subscriber known to his home system; (2) the financial responsibility of the roaming cellular subscriber; (3) the valid roamer service profile in a visited system; and (4 call delivery to a validated roaming cellular subscriber in the service area of a visited switch.

The system further comprises a general location register in said central telecommunications system processor containing a data base of all information necessary for validating and locating known roamers, and a data base of routing information for location of home carriers, whereby end-to-end validation and registration is accomplished for previously unknown roamers. The system provides call delivery information to the home switch of a roamer, routing information for forwarding calls to said roamer; and a temporary directory number as needed for forwarding calls to said roamer over the Public Switched Telephone Network (PSTN).

In a second aspect of the invention, a method for enhanced call delivery to a roaming cellular subscriber, whose presence with an active cellular telephone in a foreign service area having been detected by the MTSO of said area, enabling said subscriber to receive calls placed to his home service area, comprising the steps of notifying said home service area MTSO of the presence of said roaming cellular subscriber in said foreign service area; validating and completing the registration of said roaming cellular subscriber in said foreign service area and enabling call delivery to said roaming cellular subscriber according to his service profile. The step of notifying said home service area MTSO of the presence of said roaming cellular subscriber in said foreign service area comprises the steps of: sending a registration notification to a central network telecommunications computer; and storing said registration notification in central network telecommunications computer; and relaying said registration notification from said central network telecommunications computer to the home MTSO of said roaming cellular subscriber.

In yet another aspect of the invention, a method for enhanced call delivery to a registered roaming cellular subscriber, enabling said subscriber to receive calls placed to his MIN in his home service area, includes the steps of: receiving a call at the home MTSO of said registered roaming cellular subscriber; determining the location of said registered roaming cellular subscriber by reference to a location register; requesting a temporary directory number (TDN) (sometimes referred to as a temporary local directory number (TLDN) for delivery of said call from the MTSO of said roaming cellular subscriber; delivering a TDN to said home MTSO; upon receipt of said TDN, delivering said call to said TDN; and releasing said TDN for further use upon termination of said call. For some call delivery functions, the method further comprising the step of verifying the presence of said registered roaming cellular subscriber by reference to a visiting location register.

DESCRIPTION OF THE PREFERRED EMBODIMENT

Figure 1:
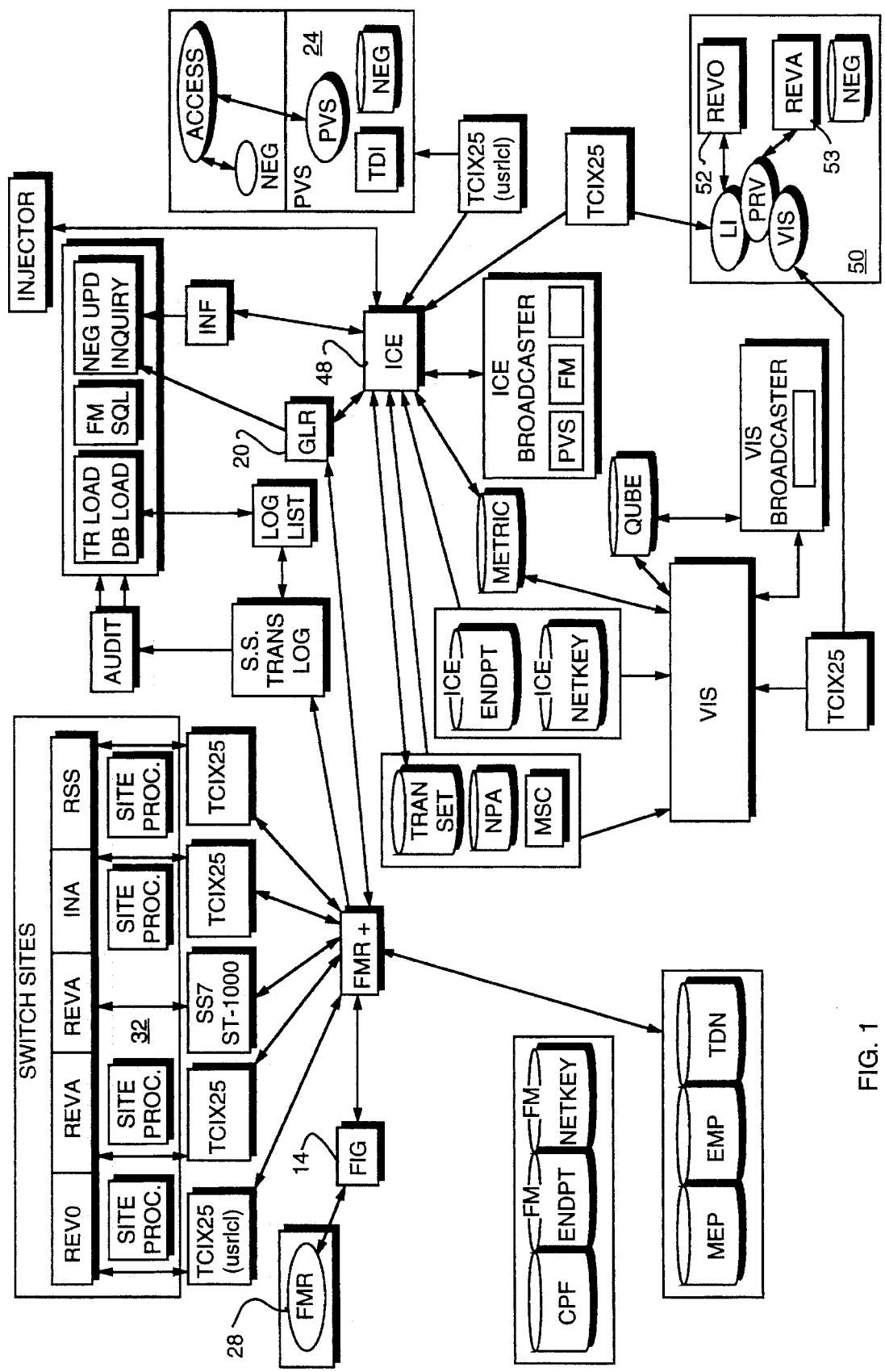
FIG. 1 is a block diagram of the architecture of the Follow Me Roaming Plus system of the present invention.

FIG. 1 presents an overview of the FMR Plus system according to the present invention in an operational context. Only those functions relevant to the present invention are discussed in this specification. FMR Plus is a service of GTE Telecommunications Services, Incorporated, Tampa, Fla.

Referring now to FIG. 1, the FMR Plus system 10 is built on a host processor 11, which is produced by Tandem Telecommunication Systems Inc. (TTSI) for network applications. FMR Plus 10 includes the Call Processor 12, and the FMR I/O Gateway (FIG) 14. The Call Processor 12 is a software application running on host processor 11 which provides the call validation and call delivery functionality for GTE TSI's FraudManager$^{sm}$ 16 and FMR Plus$^{sm}$ 10 products. FraudManager 16 is GTE TSI's pre-call validation product supporting the IS-41 protocol, but is not included in this invention. FMR Plus 10 is an automatic call delivery product supporting the IS-41 protocol for cellular subscribers roaming in other markets. IS-41 is the cellular industry standard designed to facilitate intersystem operation between dissimilar switch types. As will be explained later, Call Processor 12 maintains a number of data bases on the host processor 11, including the General Location Register (GLR) 18, and within the GLR 18 registers which were formerly called a Home Location Register (HLR) 20, and a Visitor Location Register (VLR) 22. The Call Processor 12 also interfaces with a Positive Validation System (PVS) 24. Through a port 26 on host processor 11, Call Processor 12 interfaces directly with Mobile Telephone Switching Office (MTSO) cellular switches 34 that can communicate using the IS-41 Rev. A standard, which is a point-to-point protocol. However, there are at least seven manufacturers of IS-41 switches, and each manufacturer has configured its hardware and software slightly differently, thus making point-to-point communication among switches cumbersome. To an individual IS-41 Rev. A cellular switch 34, the host processor 11 running Call Processor 12 appears to be another IS-41 Rev. A switch with which the switch can communicate using its own variation of Rev. A message formats. Call Processor 12 can recognize the variations among switch types and forward messages to diverse types of switches. This communication may follow an SS7 or X0.25 transport protocol. FMR Plus 10 connects to the older central FMR host processor 28 via FMR I/O Gateway 14. The FMR host processor 28 is connected, in turn, to FMR site processors 30, which interface directly with MTSO switches 32.

Thus, cellular switches 34 operating at the level of IS-41 Rev. A and higher connect directly by a single switch connection to the central mobile telecommunications system 10 known as Follow Me Roaming Plus (hereinafter FMR Plus), which is operated by a cellular clearinghouse for call delivery to roaming cellular subscribers and associated services for cellular carriers. If either the home service area (switch) or the visited service area (switch) of a roaming cellular subscriber is non-IS-41 or IS-41 Rev. O, and utilizes the FMR system, the FMR Plus system 10 interfaces through a site processor 30 at the FMR non-IS-41 Rev. A switch. The communications between the FMR Plus host 11 and the MTSO 30 site processor running FMR passes through an FMR I/O Gateway 14 (hereinafter FIG), then through a central FMR host processor 28 to the FMR site processor 30 providing FMR service. FMR Plus 10 is the subject of the present invention, and the two unique features of FMR Plus are its Call Processor 12 and the FIG. 14. The Call Processor 12 eliminates the need for FMR site processors 30 for switches at IS-41 Rev. A or higher, while providing for seamless interoperability among diverse switch types and call processing systems. The FIG. 14 permits the FMR Plus system 10 to communicate with the older FMR systems. Each of these unique features will be described in detail.

A single switch connection from an IS-41 switch 34 to Follow Me Roaming Plus host processor 11 provides connectivity with all other Follow Me Roaming Plus markets, as well as connectivity to all Follow Me Roaming and Phone me Anywhere markets in the United States, Canada and Mexico. Therefore, many call delivery scenarios encountered will be hybrid in nature, in which the home or serving switch utilizes FMR Plus 10 service, while the other switch utilizes Follow Me Roaming service.

The full set of call delivery scenarios are as follows:
1. FMR Plus Serving Market—FMR Plus Home Market;
2. FMR Serving Market—FMR Plus Home Market;
3. FMR Plus Serving Market—FMR Home Market; and
4. FMR Serving Market—FMR Home Market. (This scenario does not involve FMR Plus, and will not be discussed.)

Figure 2A:
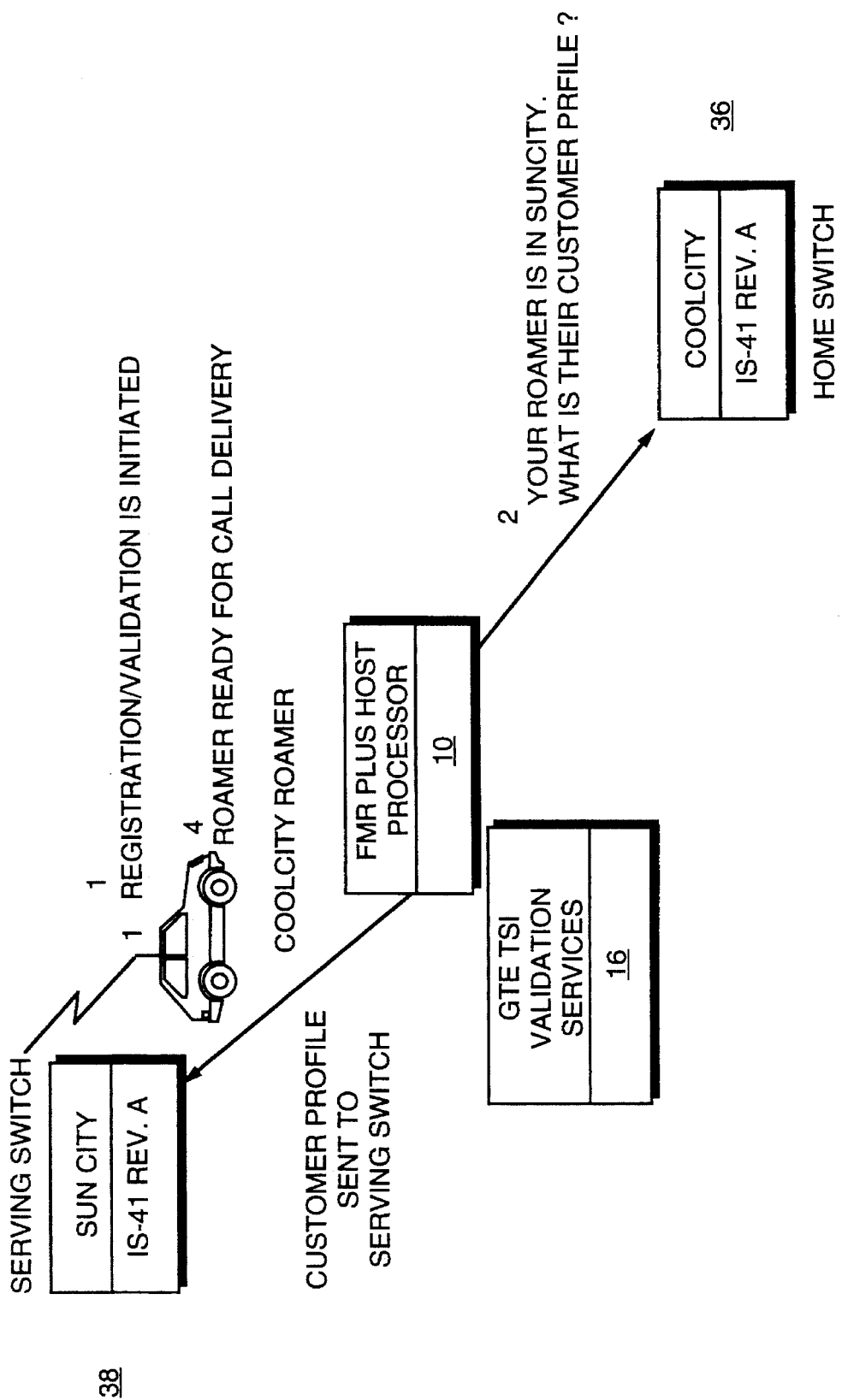
FIGS. 2a and 2b are diagrammatic presentations of the registration and call delivery processes for roaming cellular subscribers in cases in which the home and visited cellular systems subscribe to the Follow Me Roaming Plus service of the present invention.

FMR Plus Serving Market—FMR Plus Home Market—Scenario 1
Activation and Setup Process For Scenario 1
FIG. 2a illustrates the activation and set up of call delivery of a roaming subscriber 40 (roamer) from an FMR Plus Home market 36 roaming in an FMR Plus Serving or visited market 38. The FMR+host processor 11 sends and receives IS-41 Rev. A messages through the same IS-41 switch port 26 used by the FraudManager 14 service, to facilitate call delivery to both IS-41 Rev. A and non-IS-41 markets. When a subscriber with FMR Plus service roams into a FMR Plus served market, the following occurs:

1. The roamer first registers in the serving market 38 (after the mobile telephone is turned on). Autonomous registration may take place in a IS-41 Rev. A market when a cellular phone unit is powered on. The local switch 38 periodically sends out a canvassing signal asking for a response from any cellular units in the area. The roamer's phone's response begins the registration process. Once a phone is registered in a Rev. A market, the switch 38 instructs it not to respond to the canvassing signal until a future point in time. (See FIG. 6, and the discussion of registration below.)

2. At the time of registration, the home switch 36 is notified of the roamer's location, and the roamer's service profile is passed from the home switch 36 to the serving switch 38. (See FIGS. 6 and 12 also.)

When a roaming subscriber is validated (registered) in another, later visited switch or is detected back in his home switch 36, registration is automatically cancelled in the previous visited switch.

Figure 2B:
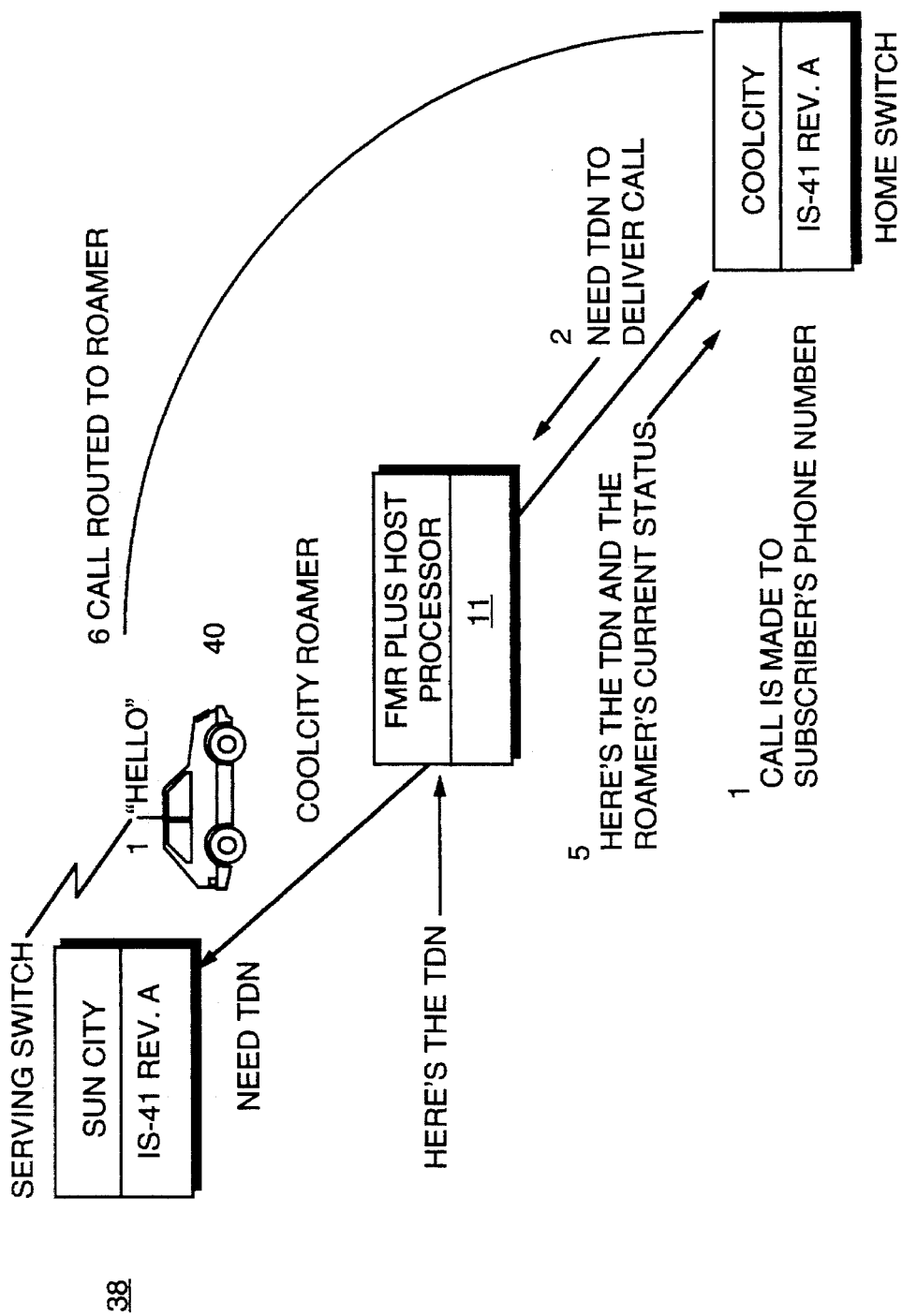

Call Delivery Process For Scenario #1
FIG. 2b illustrates the process of call delivery. Once the roamer 40 is registered and validated, Follow Me Roaming Plus 10 provides call delivery as follows (if the roamer is valid and the call delivery bit is turned on):

1. Home switch 36 receives an incoming call for the roamer 40.
2. Home switch 36 sends an IS-41 Route Request message to Follow Me Roaming Plus 10, asking for a Temporary Local Directory Number (TDN) to which the call will be routed.
3. Follow me Roaming Plus 10 sends the Route Request to the serving switch 38.
4. The Serving switch 38 responds with the appropriate TDN, before or after paging the roamer's mobile phone 40, or:
   a) If the mobile 40 is busy or does not answer, the serving switch 38 responds with a return result indicating a busy mobile or inactive mobile status, or:
   b) If the mobile's service profile (provided earlier upon registration) indicates that either Busy Transfer or No Answer Transfer is active, then a REDIRECT message is returned (to redirect the call to the transfer phone number).
5. Follow Me Roaming Plus 10 passes the results back to the home switch 36.
6. The home switch 36 routes the call if a TDN is received. If a busy/idle return result or REDIRECT message is received, the incoming call may be routed to voice mail, to another phone number (i.e., home or office landline phone) or to an announcement.

The TDN provided by the serving switch 38 is only used in routing that one call to the roamer 40. Once the call is connected, the TDN is then freed up to be used by another roamer. The TDN is dynamic. In the older call delivery systems, each FMR switch must have a single TDN assigned to every roamer receiving call delivery in its market. That particular TDN will be unavailable for other roamers until that roamer deactivates call delivery or FMR automatically deactivates at midnight.

Figure 3A:
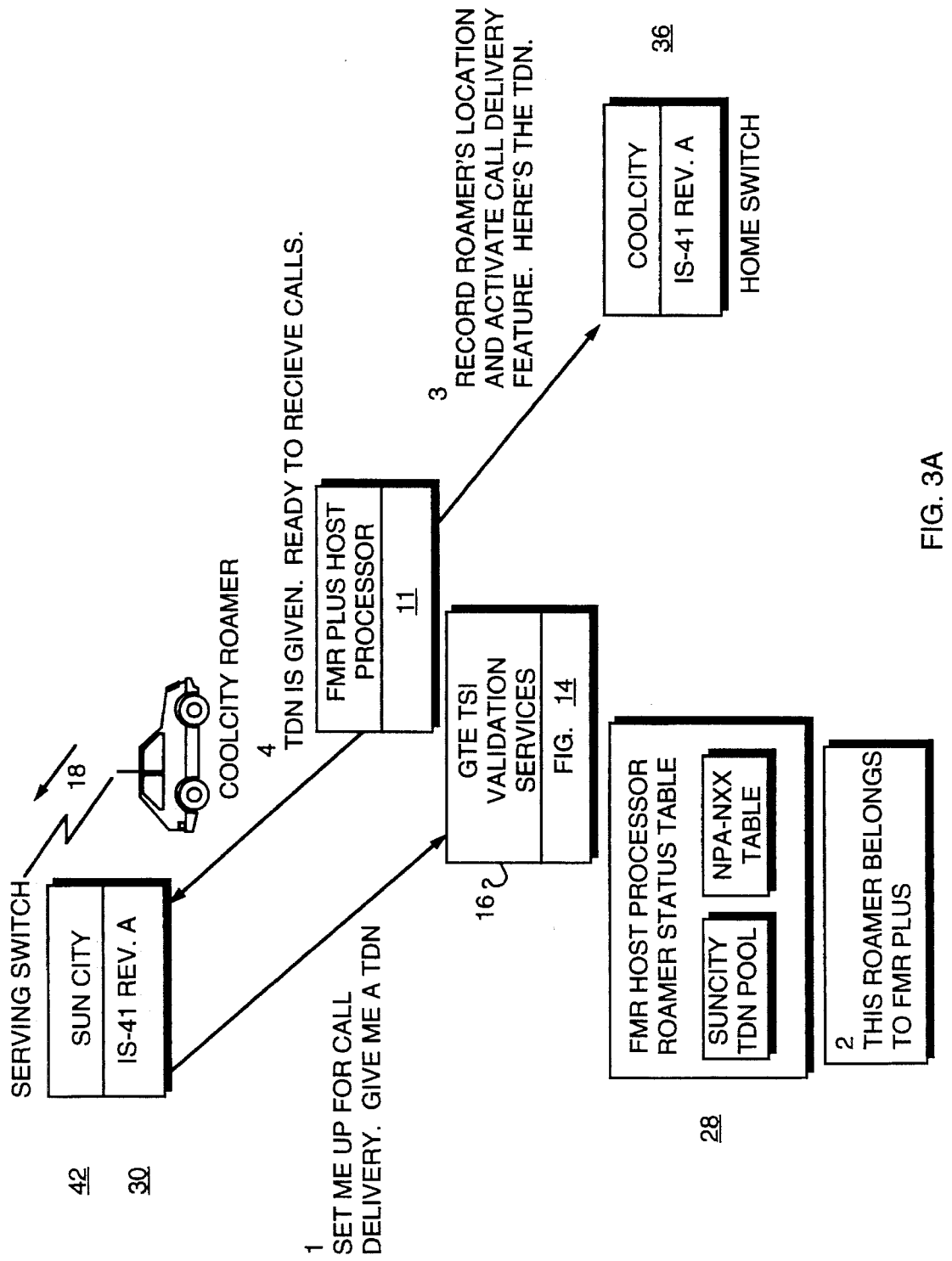
FIGS. 3a and 3b are diagrammatic presentations of the registration and call delivery processes for roaming cellular subscribers in cases in which the home cellular system utilizes Follow Me Roaming Plus and the visited cellular system utilizes an older Follow Me Roaming service.
Figure 3B:
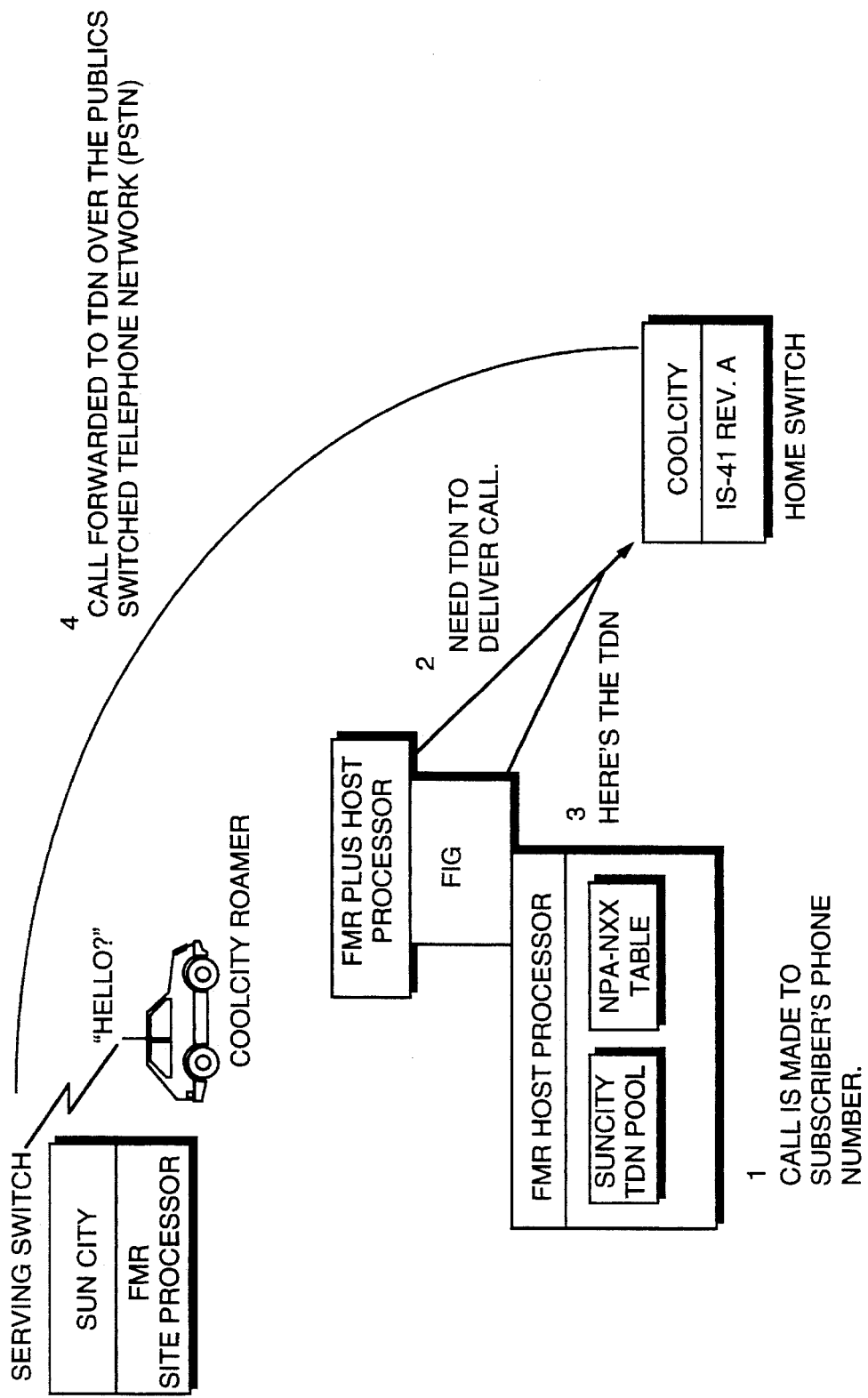

FMR Serving Market FMR Plus Home Market
FIG. 3a illustrates the activation and set up of call delivery of a roaming subscriber 40 from an FMR Plus Home market 36 roaming in an FMR Serving or visited market 42. FIG. 3b illustrates the call delivery of a subscriber from an FMR Plus Home market 36 roaming in an FMR Serving market 42.

Call Delivery Overview

The *18 SEND command is the only event that will permit call delivery to the roamer 40 in this scenario. The roamer from a FMR Plus home market must execute the *18 activation command in all FMR visited markets to initiate call delivery. When the roamer 40 executes a *18 SEND command, his call delivery feature will be activated at the home switch 36. The call delivery feature will remain active until it is turned off by a *19 SEND command form the subscriber. However, the TDN for the serving FMR market 42 will be released at midnight through the normal FMR midnight deactivation process, so the roamer 40 will be required to re-activate using the *18 SEND command after midnight each day and when entering each new FMR market to receive call delivery. The reason for this is that even though the Call Delivery bit will remain on indefinitely, the FMR system must be triggered to assign a new TDN each day and in each new serving market through the *18 SEND command.

Activation & Setup Process For Scenario #2

1. The roamer 40 enters an FMR market 42 and executes a *18 command. The visited switch's FMR site processor 30 sends an activation request back to the FMR host processor 28.

2. The FMR host processor 28 recognizes that the roamer 40 belongs to an FMR Plus home switch 36 (by analyzing the Mobile Identification Number or MID) and sends the transaction to the FMR Plus host processor 11.

3. The FMR Plus host processor 11 records the serving location of the roamer 40, and turns the call delivery feature active in the subscriber's home switch 36, if necessary.

4. The FMR host processor 28 assigns the appropriate TDN for call delivery, based on the serving market 42 where the *18 command was executed, and passes this TDN to the FMR Plus host 11, where it is recorded.

Call Delivery Process For Scenario #2

1. A phone call is received at the FMR Plus home switch 36 for the roaming subscriber 40.

2. A ROUTE REQUEST message is sent from the home switch 36 to FMR Plus 10, requesting a TDN to route the call.

3. FMR Plus 10 replies to the ROUTE REQUEST message with the appropriate TDN (previously assigned by FMR 28 and recorded by FMR Plus 10).

4. The call is routed over the PSTN to the TDN by the home switch 36.

FMR Plus Serving Market—FMR Home Market—Scenario #3

FIG. 3a illustrates the activation and set up of call delivery of a roaming subscriber 40 from an FMR Home market 44 roaming in an FMR Plus Serving or visited market 38. FIG. 3b illustrates the call delivery of a subscriber from an FMR Home market 44 roaming in an FMR Serving market 38.

Call Delivery Overview

The *18 SEND command is the only event that will permit call delivery to the roamer 40 in this scenario. The roamer from a FMR home market must execute the *18 activation command in all FMR visited markets to initiate call delivery. When the roamer 40 executes a *18 SEND command, standard FMR call forwarding will be setup at the home switch 44. FMR call forwarding will remain active until midnight deactivation or until it is turned off by a *19 SEND command from the subscriber 40.

Activation & Setup Process For Scenario #3

1. The roamer enters an FMR Plus market 38 and executes a *18 command. This registers the roamer 40 for validation and call delivery.

2. The FMR Plus processor 11 recognizes that this roamer 40 is from an FMR market and forwards the activation request to the FMR Host Processor 28. The FMR Host 28 initiates activation processing and sets up call forwarding in the home switch 44 to the appropriate TDN for the serving switch 38.

3. The home switch 44 responds back with confirmation and is ready to forward calls.

4. The FMR Plus host processor 11 records both the MID of the roamer 40 and the associated TDN.

5. Roamer 40 is now ready for call delivery.

Call Delivery Process For Scenario #3

1. A phone call is received at the FMR home switch 44 for the roaming subscriber 40.

2. The phone call is directly forward through the PSTN to the assigned TDN.

3. The serving switch 38 receives the call via the TDN and sends a message to the FMR Plus Host 11, requesting the correct roamer 40 mobile phone MID to page so that the call may be delivered.

4. The FMR Plus host 11 responds to the serving switch 38 with the correct MID of the roaming mobile 40.

5. The mobile phone is paged and the call is delivered.

CALL PROCESSOR

Figure 5:
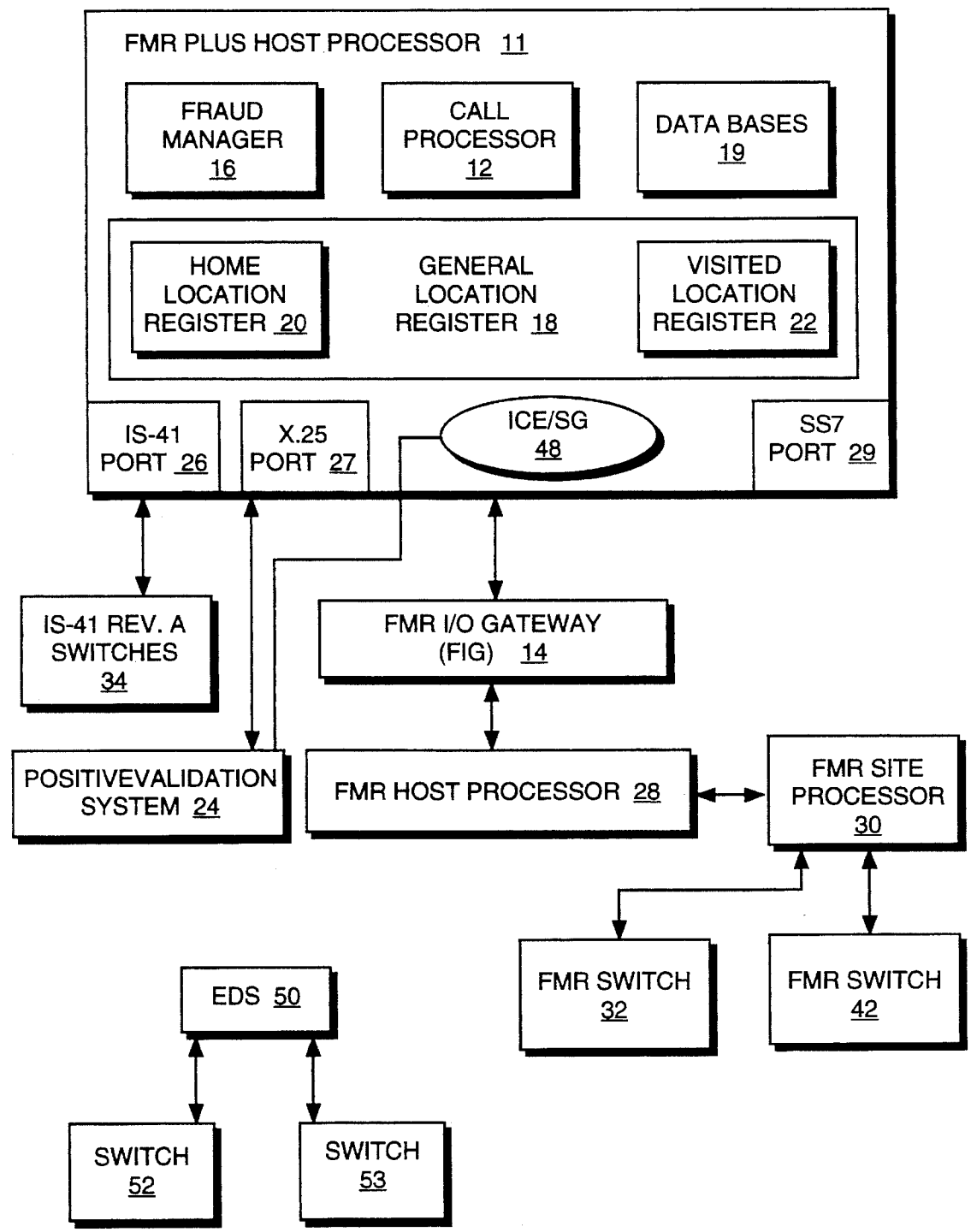
FIG. 5 is a simplified block diagram of the system of FIG. 1 showing the FMR Plus system of the present invention.

FIG. 5 is a simplified block diagram of the system of FIG. 1 showing the functional features relevant to the invention. The FMR Plus system 10 is built on the Tandem Telecommunication Systems Inc. (TTSI) platform for network applications, which is the host processor 11. FMR Plus 10 includes the Call Processor 12 and the FMR I/O Gateway (FIG) 14. The Call Processor 12 provides the call validation and call delivery functionality for GTE TSI's FraudManager$^{sm}$ 16 and FMR Plus$^{sm}$ 10 products. Referring to FIG. 5, the Call Processor 12 is a software system which operates on the host processor 11. This host system software platform 11 distributes incoming messages and their responses, provides the signaling and connection interfaces, and collects information for alarms, and exception and statistics reporting.

Call Processor 12 interfaces with IS-41 Rev. A cellular switches 34, 35, 36 that can communicate using the IS-41 Rev. A standard. This communication may follow an SS7 or X0.25 protocol. The Call Processor also interfaces with FIG. 14 in the Tandem host processor 11, which in turn interfaces with older FMR systems via the FMR host processor 28. Call Processor 12 also interfaces with Inter-Clearinghouse Exchange/Inter-System Gateway (ICE/ISG) 48, through which it interfaces with the EDS clearinghouse system 50 and the MTSOs connected therewith 51–53. All interaction between the Call Processor 12 and PVS 24 is handled by ICE/ISG 48. The seamless interoperability of the Call Processor 12 between diverse switch types and between diverse call delivery systems is the subject of this invention.

The Call Processor 12 performs two primary functions:

Call delivery to a roaming subscriber; and

Pre-call validation of a roaming subscriber.

Call Delivery

A cellular subscriber who is in a market other than his/her home market and who attempts to send or receive a call is referred to as a roamer. Automatic roaming is the process by which a cellular telephone system responds to the presence of a roamer by informing the home system of its presence; determines the roamer's credit worthiness; obtains the roamer's service profile; permits a roamer to originate calls and operate subscribed features; and provides information needed for routing calls to the roaming subscriber in question. Call delivery with automatic roaming includes automatic mechanisms for the following:

Making the identify of the current serving, i.e. visited system, known to the home system;

Establishing financial responsibility for the roaming subscriber;

Establishing a valid roamer service profile in a visited system;

Providing for call delivery to the roaming subscriber.

Figure 4A:
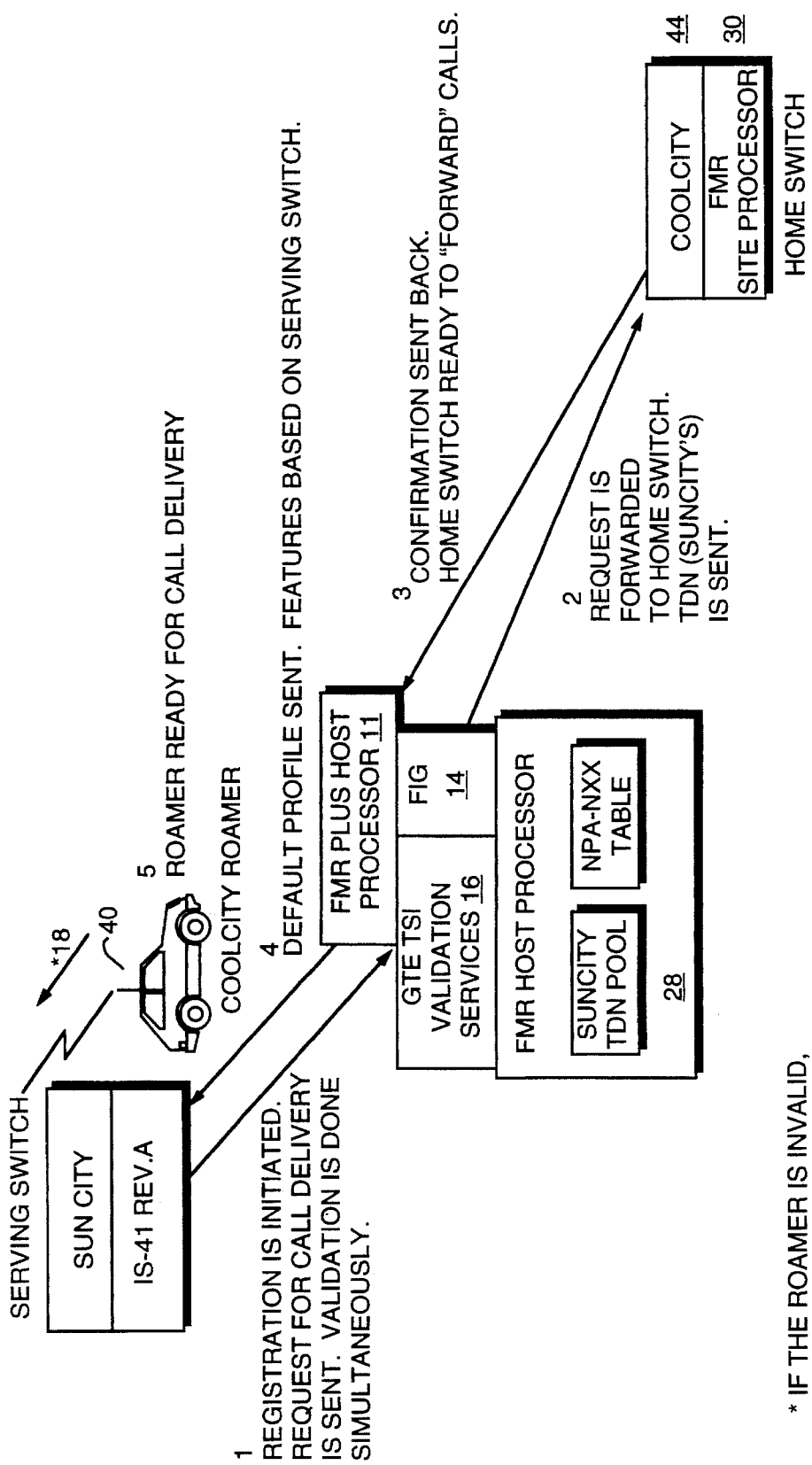
FIGS. 4a and 4b are diagrammatic presentations of the call delivery process for roaming cellular subscribers in cases in which the visited cellular system utilizes a Follow Me Roaming Plus service, while the home cellular system utilizes an older Follow Me Roaming service.
Figure 4B:
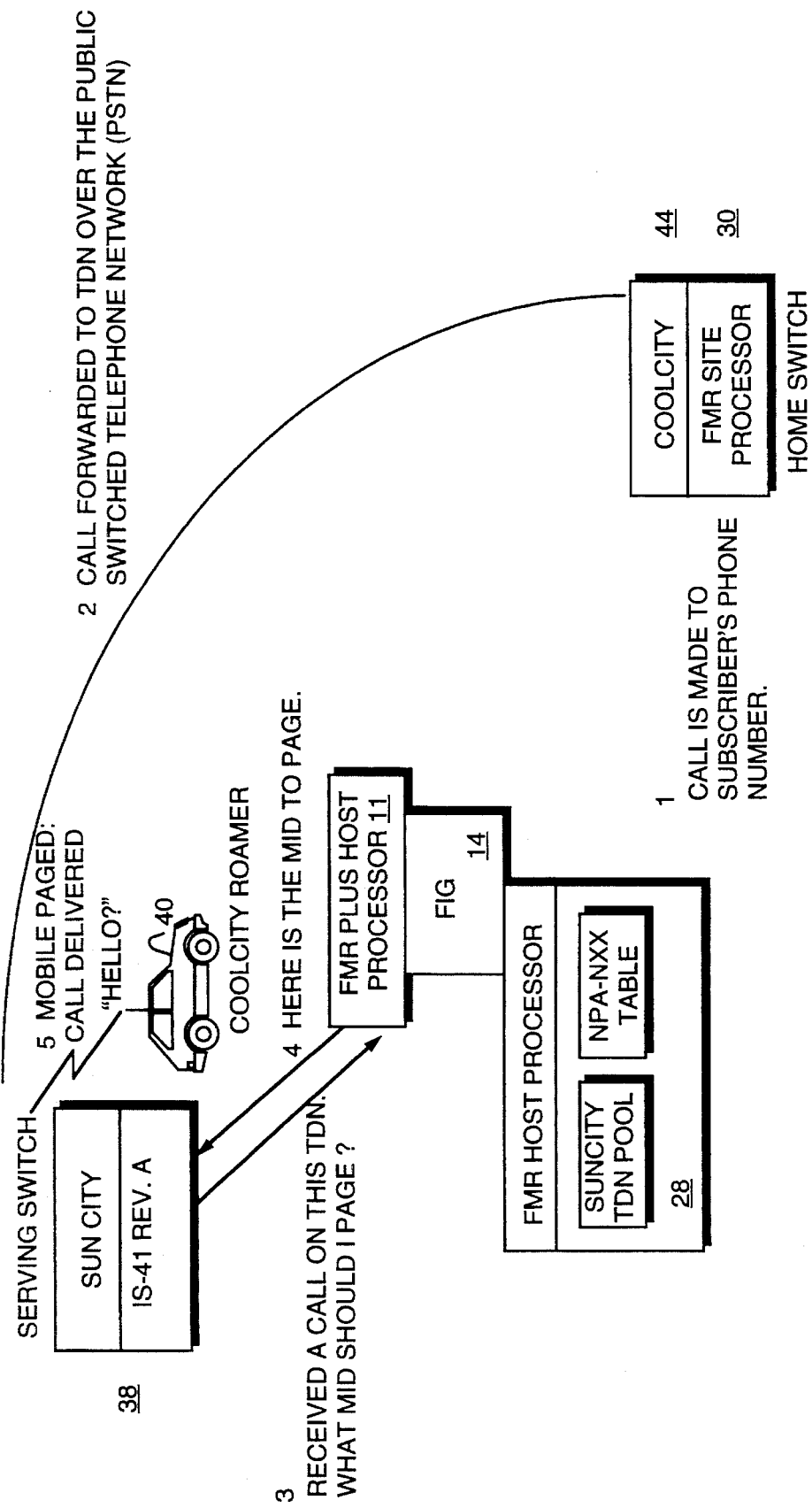

The registration of a roaming cellular subscriber 40 from a Rev. A home switch 36 in a visited Rev. A switch 38 and normal call delivery is diagrammatically illustrated in FIGS. 2a and 2b, and will be again discussed later. FIGS. 3a and 3b are diagrammatic presentations of the registration and call delivery processes for roaming cellular subscribers in cases in which the home cellular system 36 utilizes Follow Me Roaming Plus and the visited cellular system 42 utilizes an older Follow Me Roaming serrvice. FIGS. 4a and 4b are diagrammatic presentations of the call delivery process for roaming cellular subscribers in cases in which the visited cellular system 38 utilizes a Follow Me Roaming Plus service, while the home cellular system 44 utilizes an older Follow Me Roaming sservice. The home switch 36 for a roaming subscriber is notified to deliver calls to the subscriber's current location after the Call Processor 12 validates that the roaming subscriber is not fraudulent.

Pre-call Validation/Registration

Pre-call validation provides protection against roamer fraud by performing roamer validation prior to connecting the first call and stopping known fraudulent roamers, and tumbling ESN and tumbling MIN users prior to their first call. Through the call teardown process, fraudulent users are disconnected when they are identified. Various techniques and systems for pre-call validation are known in the prior art and available commercially.

Upon inquiry from a visited switch 38, Call Processor 12 returns to the visited switch the status of a roaming subscriber 40 within six seconds of receiving an IS-41 message from the visited switch due to autonomous registration or a call attempt from or to a roaming subscriber. The Call Processor 12 maintains a General Location Register (GLR) 18 containing all information necessary for validation of known roamers. It also contains routing files 54 used by Call Processor 12 to locate the Home Carrier 36, for validation when roamer is unknown. The pre-call validation operation of the Call Processor 12 conforms to the guidelines established by the IS-41 series (Rev. 0 and Rev. A) of recommendations on Cellular Radiotelecommunications Intersystem Operations. A request sent to an IS-41 home switch 36 usually receives a response within one second. In the FMR Plus system of the present invention, the visited carrier may choose among five optional call validation features, which are part of the Fraud Manager 16 software.

Transaction Processing Flow in Call Processor

Transaction processing flow is a high level representation of the functions performed in the Call Processor 12. In this section, the transaction processing flow for each relevant Mobile Application Part (MAP) message is described, and illustrated in FIGS. 6 through 14 inclusive. Steps related to pre-call validation are not presented in detail.

Figure 6:
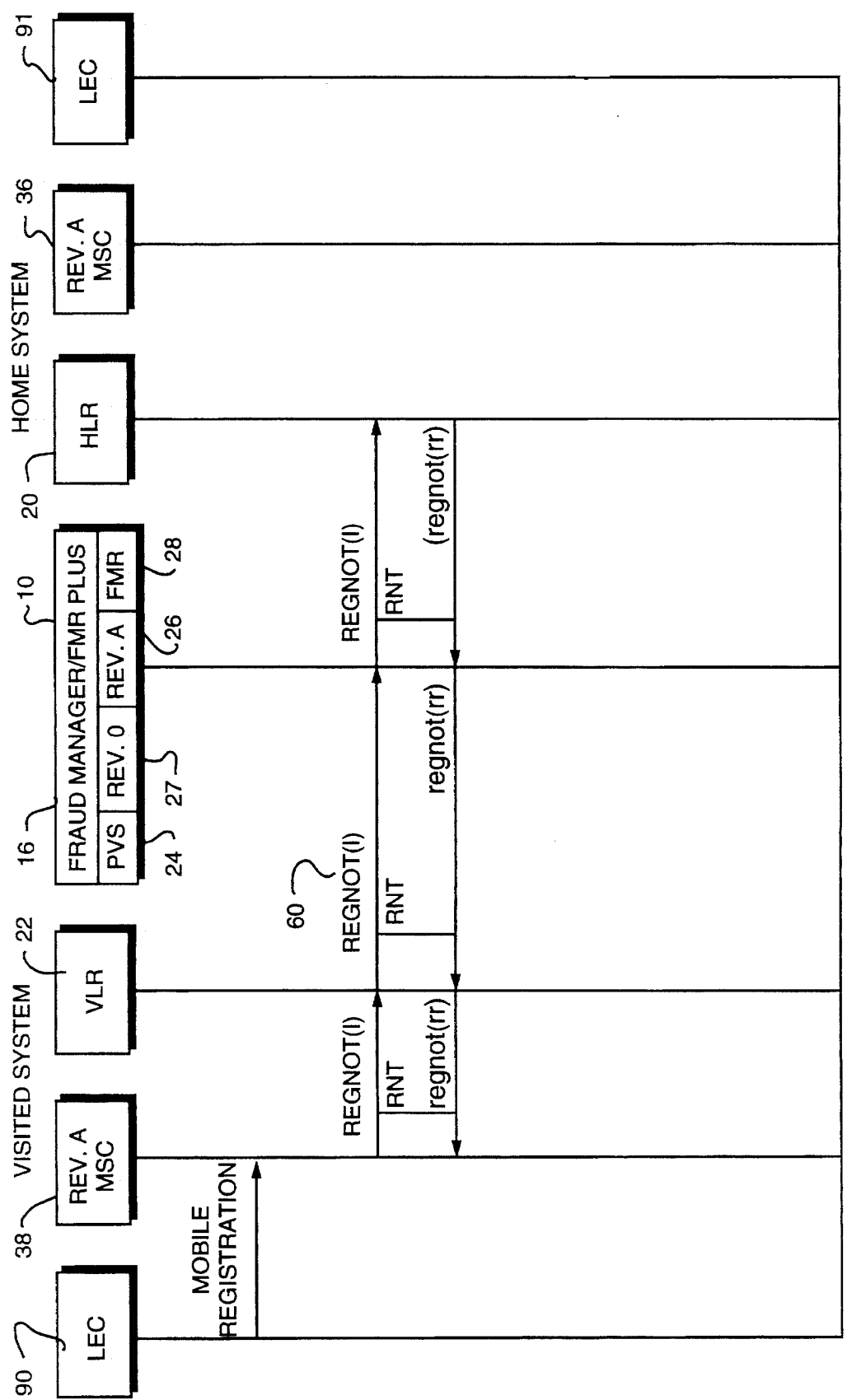
FIG. 6 is a diagrammatic representation of the process of registration of a Rev. A roamer in a Rev. A visited cellular system.
Figure 7:
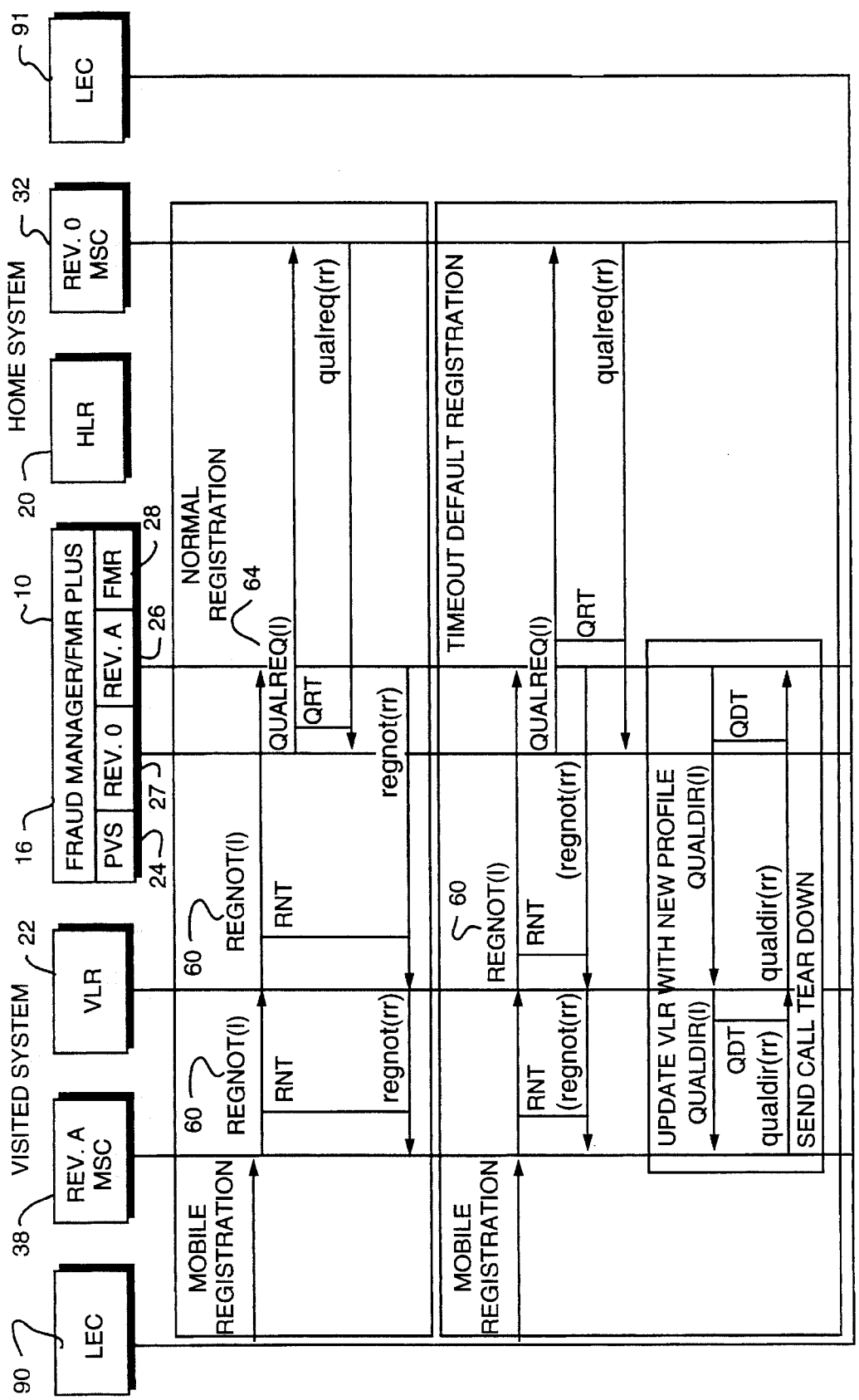
FIG. 7 is a diagrammatic representation of the process of registration of a roamer from a Rev 0 home system in a Rev. A visited cellular system.
Figure 8:
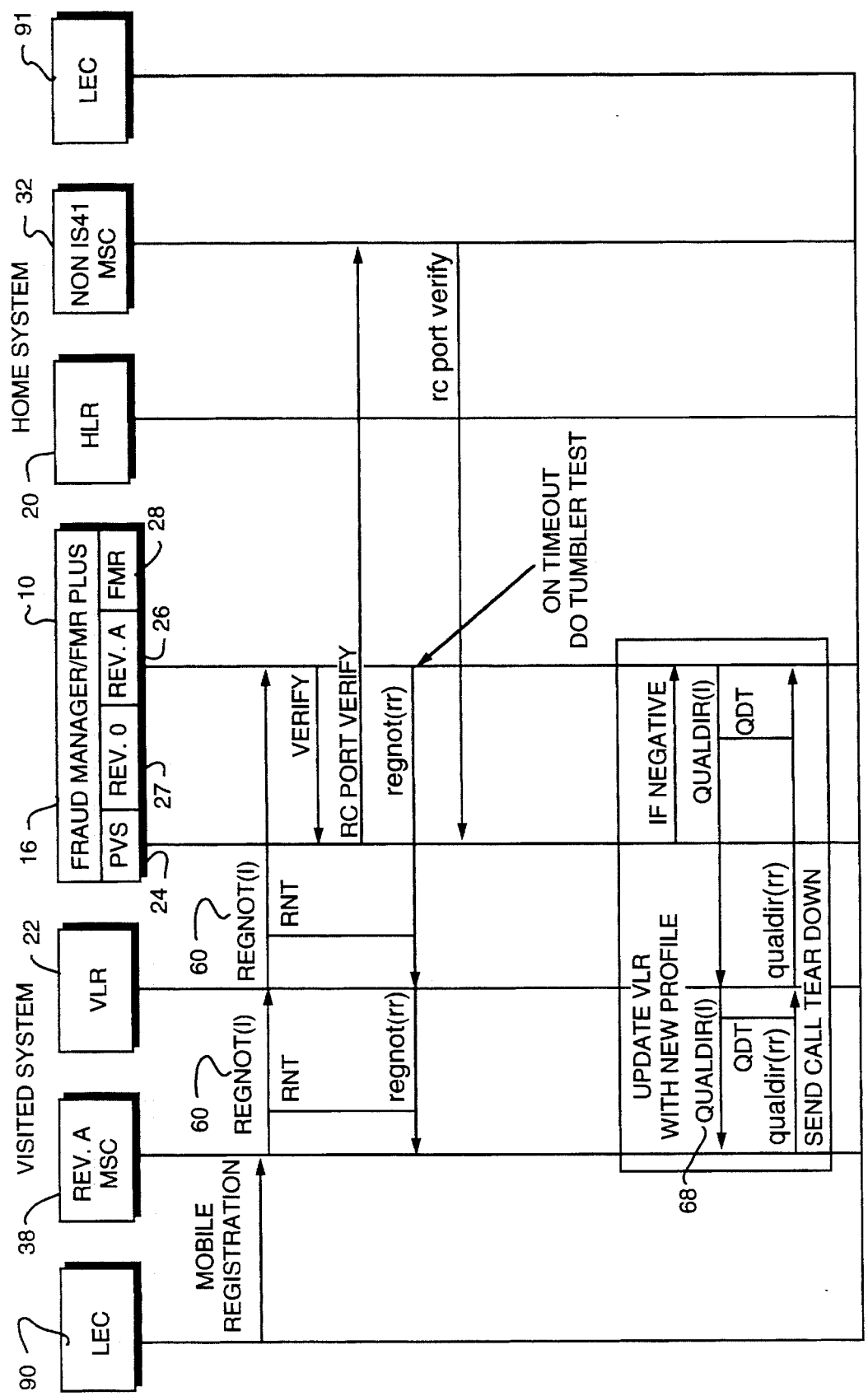
FIG. 8 is a diagrammatic representation of the process of registration of a roamer from a non-IS-41 home system in a Rev. A visited cellular system.
Figure 9:
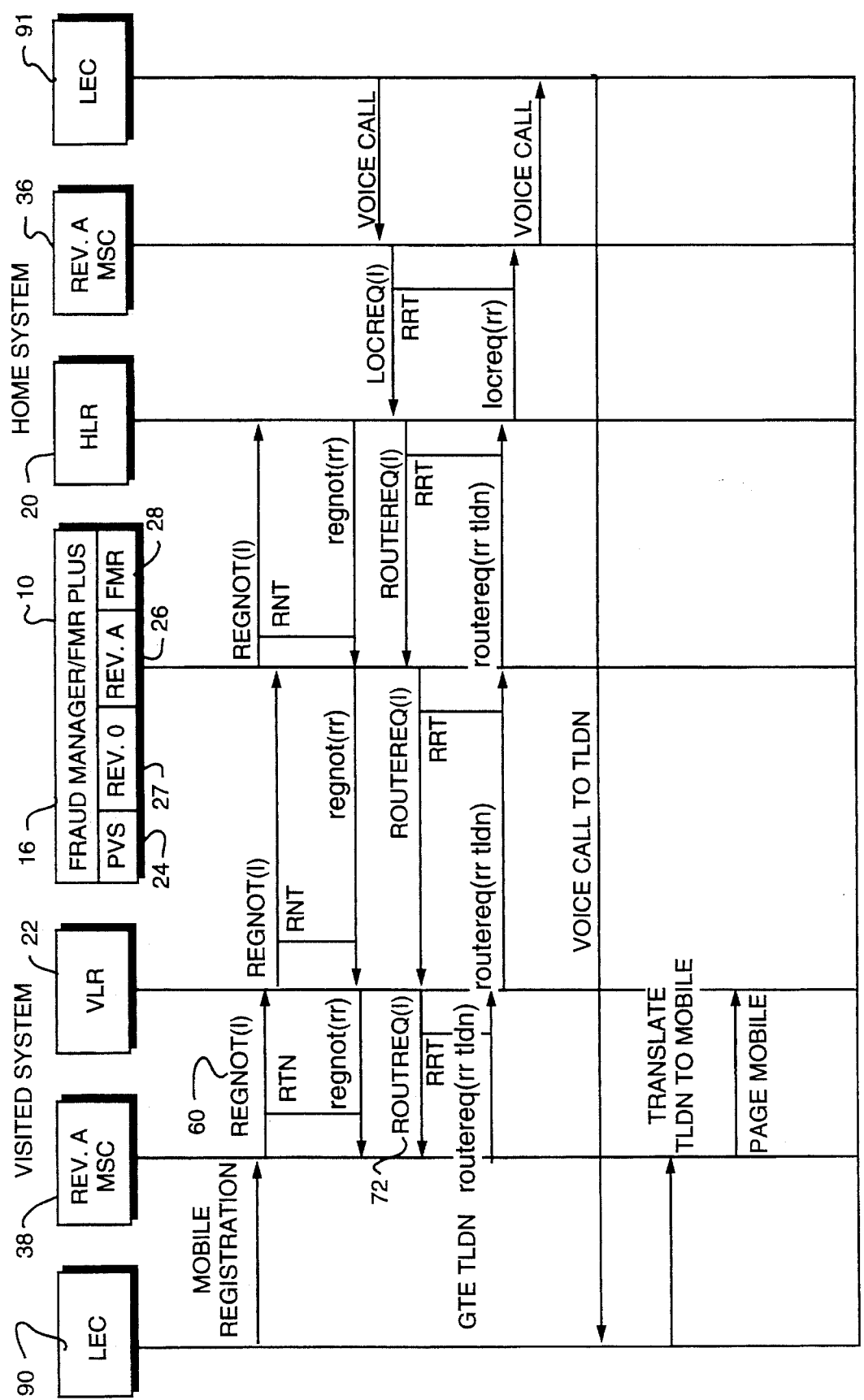
FIG. 9 is a diagrammatic representation of the process of call delivery for a FMR Plus Rev. A roamer in a FMR Plus Rev. A visited cellular system.
Figure 10:
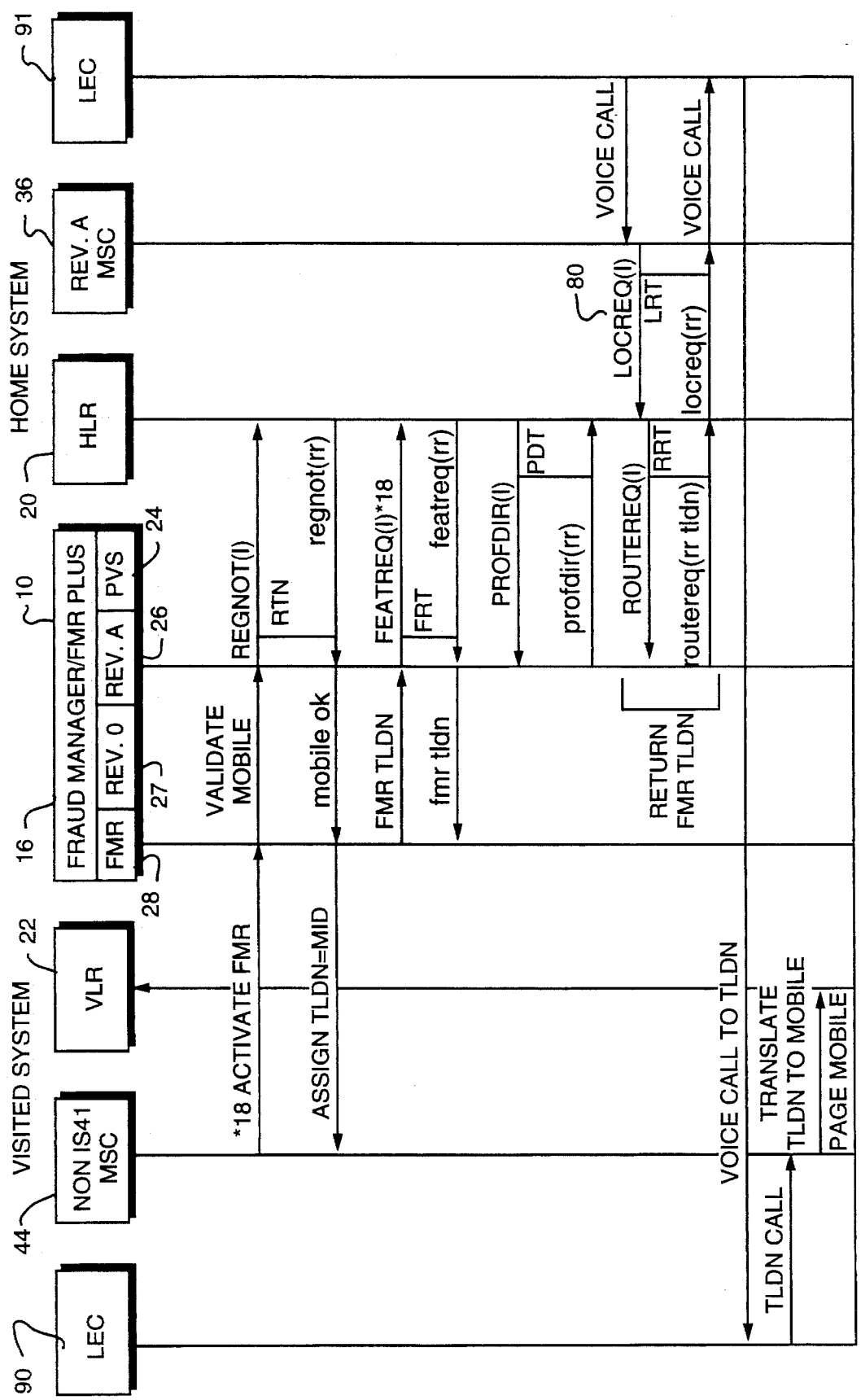
FIG. 10 is a diagrammatic representation of the process of call delivery for a FMR Plus Rev. A roamer in an FMR visited cellular system.
Figure 11:
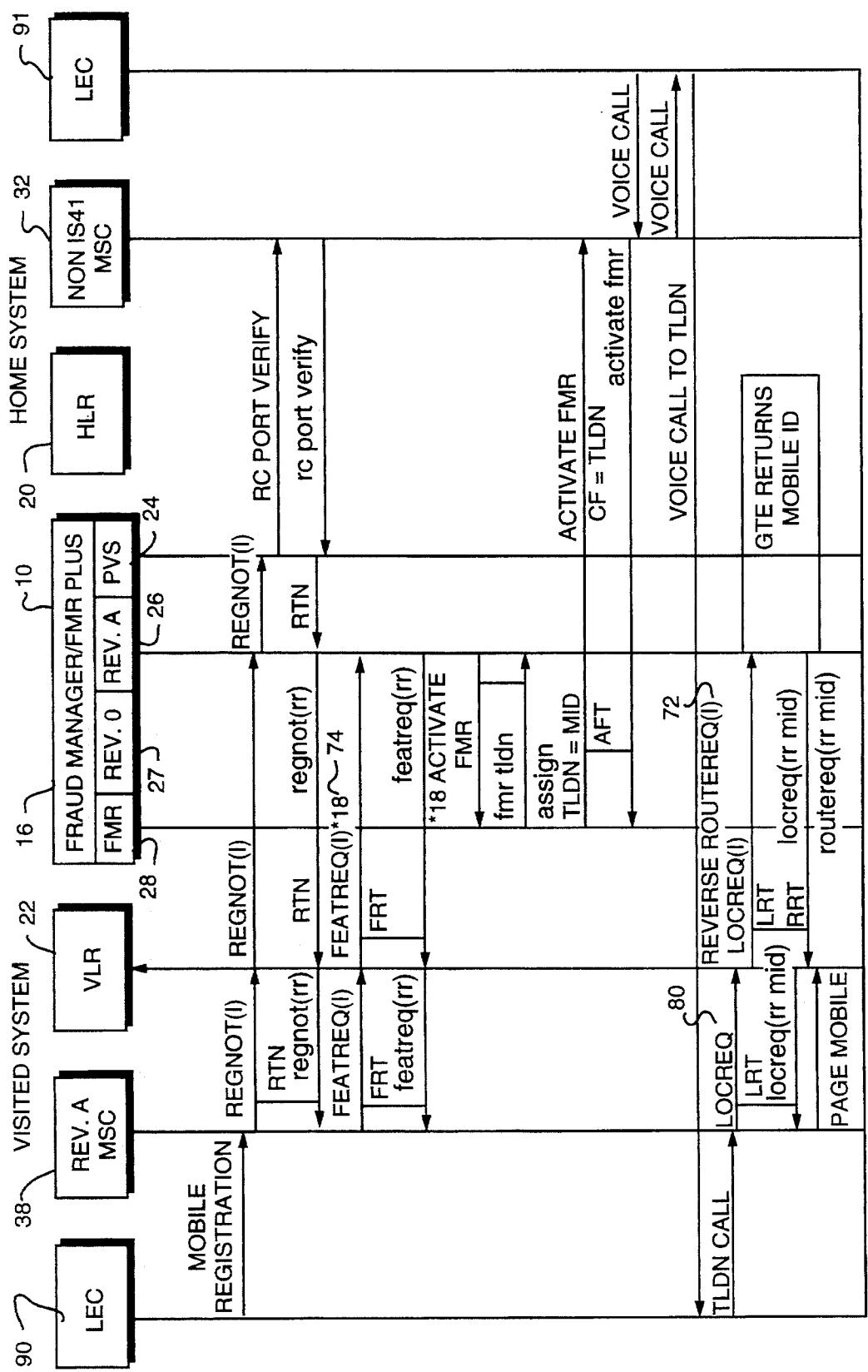
FIG. 11 is a diagrammatic representation of the process of call delivery for a FMR roamer in an FMR Plus visited cellular system.
Figure 12:
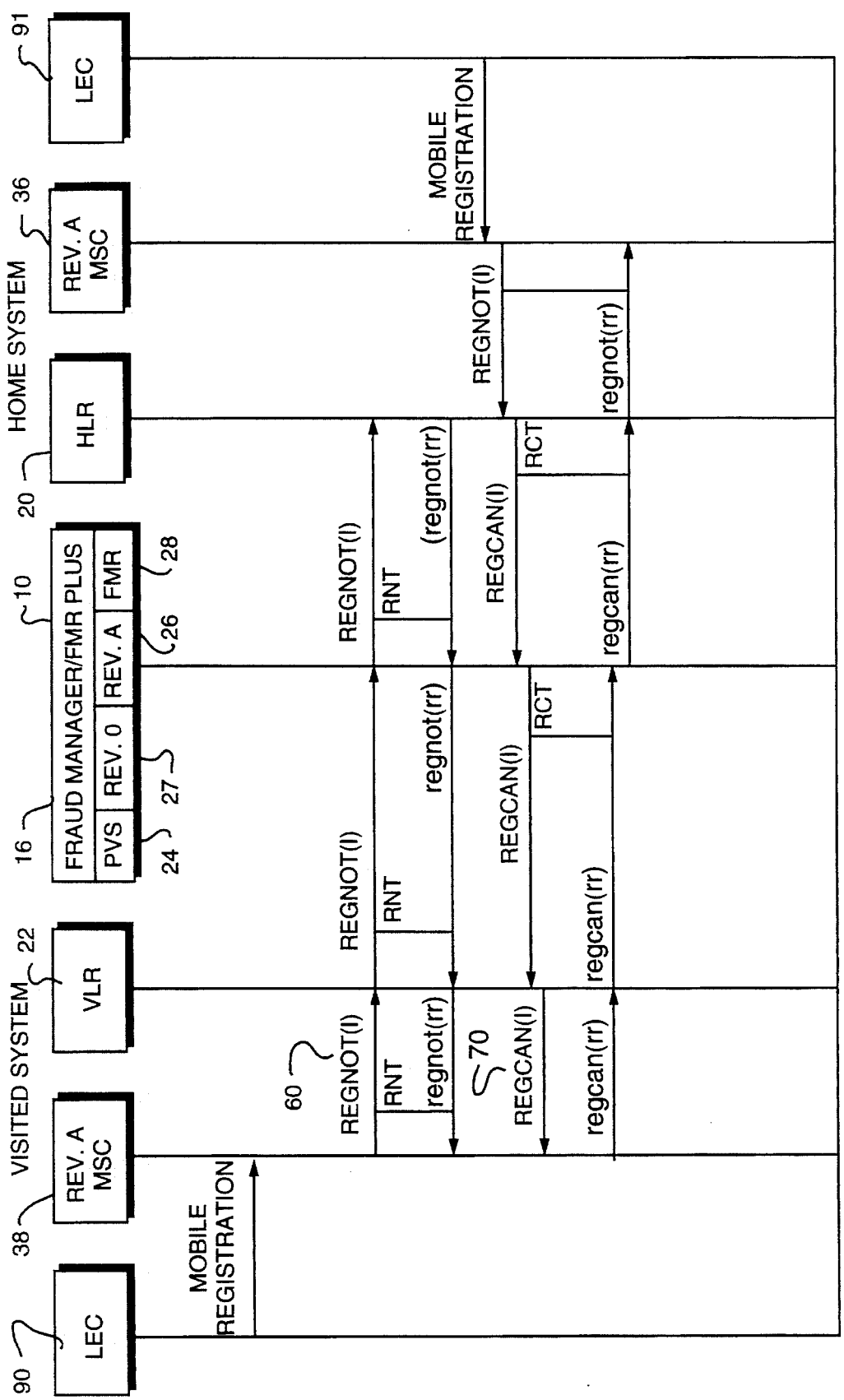
FIG. 12 is a diagrammatic representation of the process of cancellation of registration when a roamer returns to a home system utilizing FMR Plus.
Figure 13:
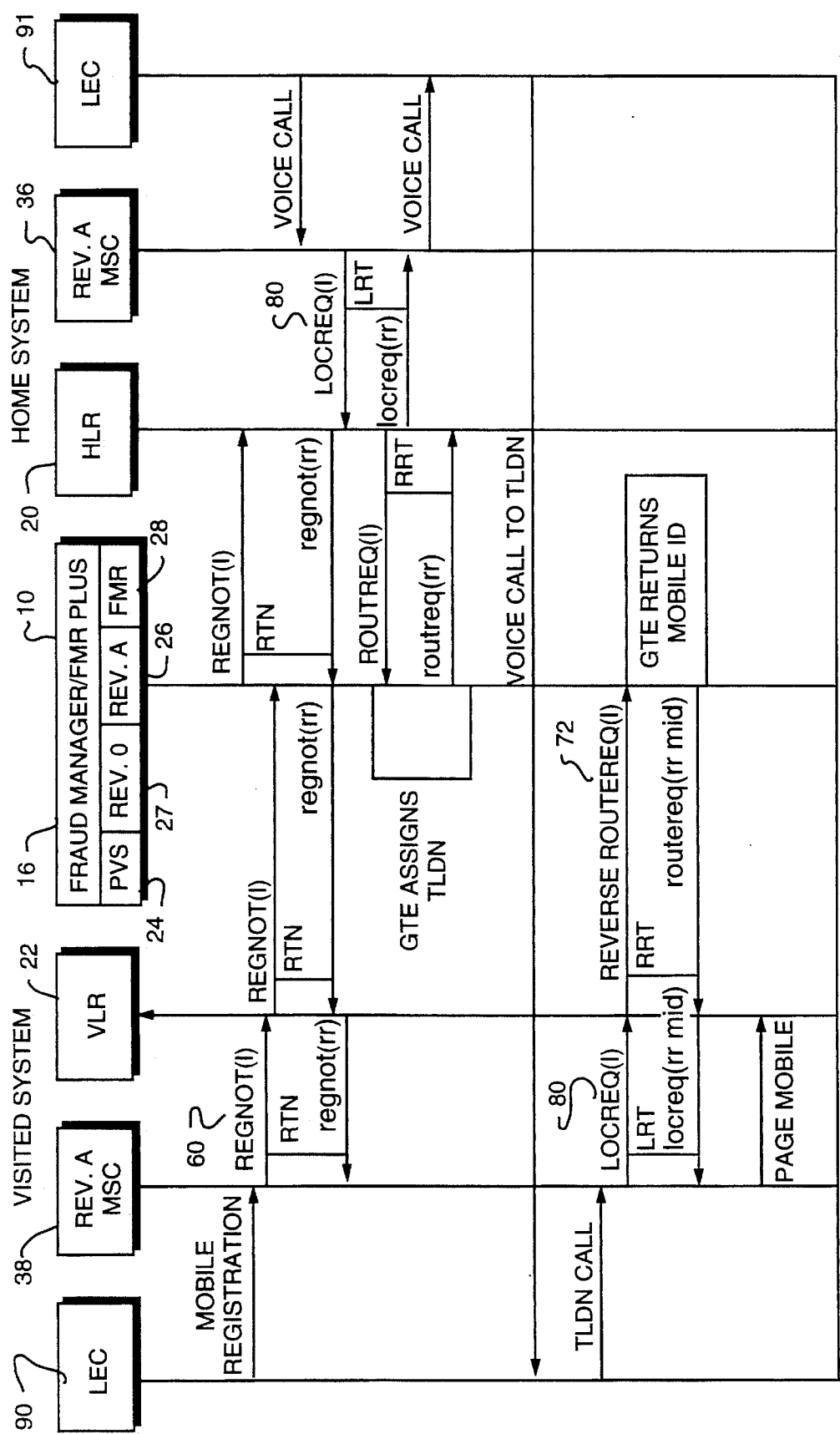
FIG. 13 is a diagrammatic representation of the process of call delivery for a FMR Plus Rev. A roamer in a FMR Plus Rev. A visited cellular system with the home system restricted.
Figure 14:
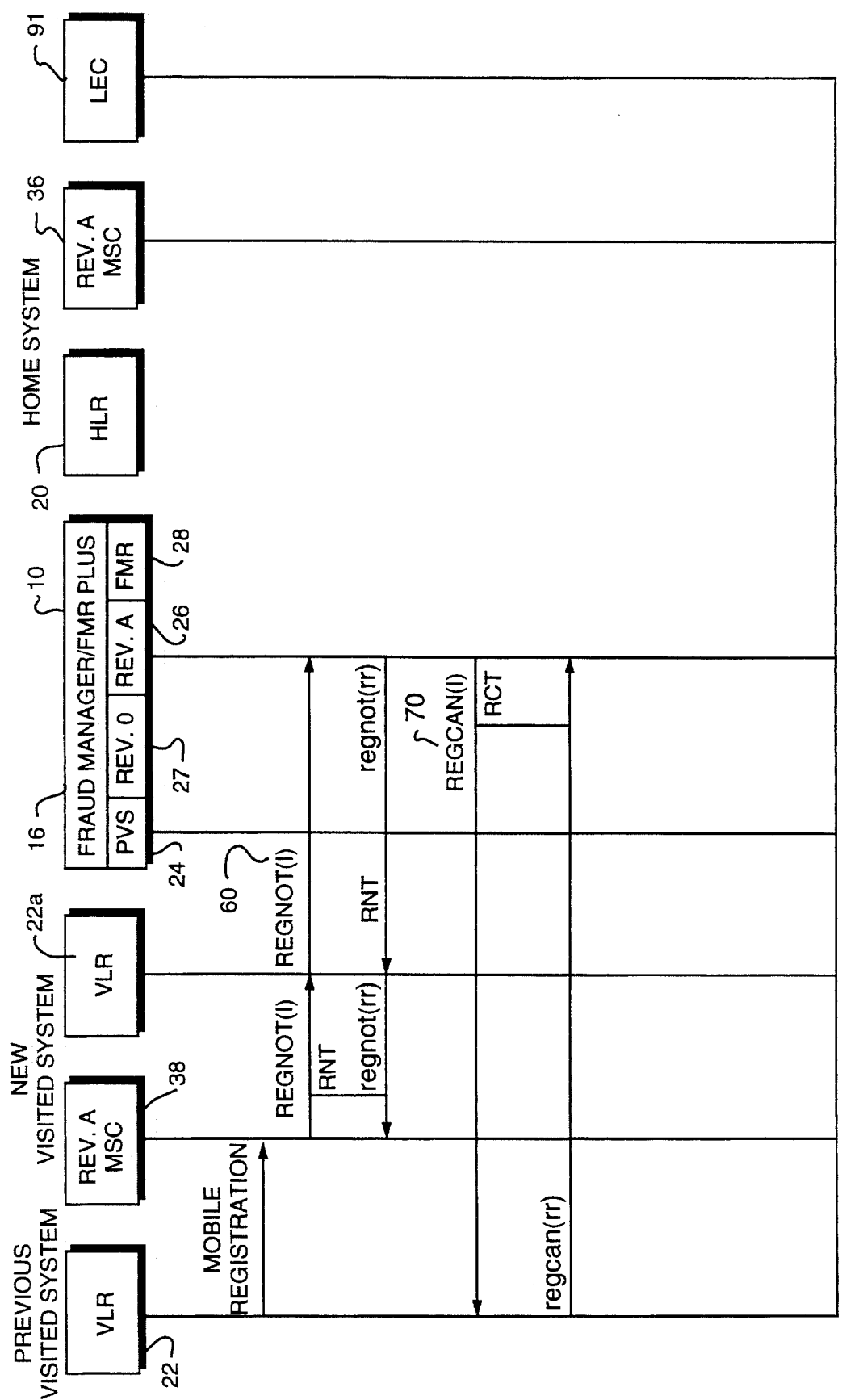
FIG. 14 is a diagrammatic representation of the process of registration of a FMR Plus Rev. A roamer in a newly visited FMR Plus Rev. A visited cellular system with cancellation of registration in a previously visited system.

The MAP messages, their acronyms (and the drawing Figures in which they appear), and usage are as follows:

Call Validation:

| | | |
|---|---|---|
| REGNOT | Registration Notification 60 | Generated when a roaming subscriber is detected through autonomous registration, call origination, call termination, or other mechanism |
| FIGS. 6–14 | | |
| QUALREQ | Qualification Request 64 | To retrieve a subscriber's qualification information |
| QUALDIR | Qualification Directive 68 | To update a subscriber's qualification information in the current visited location |
| FIGS. 7–9 | | |
| REGCAN | Registration Cancellation 70 | To cancel a subscriber's registration in a previously visited VLR |
| FIGS. 12, 14 | | |

Call Delivery:

| | | |
|---|---|---|
| FIGS. 9–11 | | |
| ROUTREQ | Routing Request 72 | To provide a temporary number in the current visited system so the subscriber's home market can deliver a call |
| FIGS. 9–11 | | |
| FEATREQ | Remote Feature Control Request 74 | To request a remote feature control function |
| FIGS. 10, 11 | | |
| PROFDIR | Service Profile Directive 62 | To update a subscriber's service profile information in the current visited system |
| FIG. 10 | | |
| CSSINACT | CSS Inactive 76 | A visited system detects a roaming subscriber is no longer active in its service area |
| PROFREQ | Service Profile Request 66 | To retrieve a subscriber's service profile information |
| REDREQ | Redirection Request 78 | A call cannot be delivered to a roaming subscriber that does not answer or is already active on another call |

-continued

| LOCREQ | Location Request 80 | To determine the roaming subscriber associated with a temporary number that has a call to be terminated. |
|---|---|---|
| FIGS. 9, 10, 11, 13 | | |

When a transaction is received, the message undergoes SS7 or X0.25 level 2 verification to ensure it was received error free. X0.25 level 3 parsing is also performed to identify the network routing destination for the message. Call Processor 12 maintains data bases with the relevant information for each switch, the type of switch, how that switch handles each IS-41 message, so that knowing the origin and destination of a message, Call Processor 12 can interpret incoming messages, process them, and deliver them in a format acceptable to the destination.

Registration Notification

FIG. 6 is a diagrammatic presentation of the registration 60 of roaming FMR Plus cellular subscriber 40 in an FMR Plus cellular system 10, and the process of normal call delivery.

A Registration Notification (REGNOT) 60 is generated by the visited switch 38 to the Call Processor 12 when a roaming subscriber is detected through autonomous registration, call origination, call termination, or other mechanism. The time the transaction was received is recorded; the configuration data for the visited switch 38 is looked up based on the mobile switch center identification (MSCID). Configuration records for visited MSCIDs indicate the call delivery type.

The Call Processor 12 checks to see if the transaction is supported from this switch. If the transaction is not supported for the originating MSCID, then an Operation Not Supported error is returned.

The Call Processor 12 then performs parameter edits and returns an error response if necessary. If the home MSCID cannot be identified, an error is returned. If the databases of Call Processor 12 contain current information, a response is returned. FMR Plus 10 then completes any necessary call delivery set up, and cancels any previous registrations. Otherwise, the Registration Notification is sent to the home switch. On receipt of the response, the information is forwarded to the visited switch. FMR Plus 10 stores the roamer's current visited location for further transactions.

Qualification Request

A Qualification Request 64 is generated when a subscriber's qualification information needs to be retrieved. This does not necessarily mean that the subscriber is roaming in the requesting entity's area, and does not affect call delivery.

Qualification Directive

A Qualification Directive 68 is generated to update a subscriber's qualification information in the current visited location. Call Processor 12 sends this information to the current visited location if that location supports this message.

Routing Request

A routing request 72 is generated when a subscriber's home market needs a temporary number from the current visited system so it can deliver a call. A Reverse Routing Request is generated when a visited switch needs the MIN of a roaming subscriber that is call forwarded in his home switch to a visited switch temporary number that has just received a call. The MIN returned is paged by the visited switch for connection to the call into its temporary number. The Reverse Routing Request is unique to FMR Plus 10, and is necessary to support FMR 28 call delivery. The Call Processor 12 performs the following functions:

Determine if this is a "backwards" Route Request by checking for a pre-determined parameter value. If so, then the visited switch has sent an invoke asking for the roamer's MIN that is assigned to a TLDN to which the visited switch received a call.

Using information in the databases of Call Processor 12, FMR Plus 10 attempts to find the MIN to which FMR assigned the TDLN. If this information is found, the MIN is returned so that the visited switch can page the correct unit.

If this is a normal routing request from the home switch, then processing depends on what call delivery system is used by the current visited switch.

If the current visited SWITCH is an FMR switch and a TLDN has been assigned to the roaming subscriber by FMR, then the response will contain the TLDN.

If the current visited SWITCH record is an FMR switch and no TLDN has been assigned to the roaming subscriber by FMR, then a response is sent to indicate call delivery is not active.

If the current visited SWITCH is an FMR Plus switch, then the request is sent to the current visited switch. The result returned from the visited switch is then returned to the home switch.

FMR Plus 10 provides special processing to allow home switches to comply with legal restrictions.

Remote Feature Control Request

A Remote Feature Control Request (FEATREQ) is generated when digit analysis for a subscriber's dialed digits indicates that a remote feature control function is desired. The Call Processor 12 performs the following steps:

If the home switch Configuration record indicates the switch is an FMR Plus switch, then a Remote Feature Request 74 is sent to the destination and the result is returned to the visited switch.

If the home switch is an FMR switch and the dialed digits are *18, then FMR Call Delivery Setup is initiated.

If the home switch is an FMR switch and the dialed digits are *19, then FMR call delivery deactivation is initiated.

Service Profile Directive

A Service Profile Directive 62 (PROFDIR) is generated to update a subscriber's service profile information in the current visited system. Call Processor 12 performs the following steps:

If call terminations are no longer allowed and a TDLN was assigned by FMR, call delivery deactivation is initiated. Get the time the transaction was received.

If the current visited switch is an IS-41 Rev. A switch, then a Profile Directive 62 is sent from the host processor 11 to the current visited MSCID. The result is returned to the home MSCID.

Registration Cancellation

A Registration Cancellation 70 (REGCAN) is generated when the home system detects that a subscriber has moved to a new visited market or has returned to his home market. FMR Plus also generates this message when a roamer moves to a new serving area.

If the current visited switch is an IS-41 Rev. A switch, then a Registration Cancellation 70 is sent from the host processor 11 to the current visited MSCID.

If an FMR TDLN was assigned, then FMR call delivery deactivation is initiated.

CSS Inactive

A CSS Inactive message 76 (CSSINACT) (FIG. 19) is generated when a visited system detects that a roaming subscriber is no longer in its service area. This message is not supported by FMR Plus.

Service Profile Request

A Service Profile Request 66 (PROFREQ) is generated when a subscriber's profile information needs to be retrieved. The Call Processor 12 takes the following steps:

If current information is found in the databases, that information is returned to the MSCID; otherwise, the request is sent to the home MSCID. When the information is received, it is stored and forwarded to the visited MSCID.

The Subscriber Service Profile is contained in the Home Location Register (HLR) 20 in the home switch 36 or in the General Location Register 18. When a roamer registers in a serving switch 38, this profile is recorded by both FMR Plus and FraudManager 16 and then passed to the serving switch 38, where it is also recorded in the Visited Location Register (VLR) 22. Copies of the HLR 20 and the VLR 22 may be present in host processor 11, as will be explained later. In host processor 11, the HLR 18 and VLR 22 are included within the GLR 18.

This profile notifies the serving switch 38 of the subscriber's Preferred Interexchange Carrier (PIC) and the subscriber's home features currently authorized (.e.g., Call Waiting, Busy Transfer, etc.). Each of these features is represented by flags or bits that can be set Feature Provided (Y/N), feature inactive/feature ON (active) or OFF (inactive). The call delivery bit, in particular, must be turned ON for FMR Plus to provide call delivery from the home 36 system to the visited system 38.

The home switch 36 can update a visited switch 38 with new profile information for a roaming subscriber 40. The visited switch 38 can also request new profile information for a roaming subscriber.

Redirection Request

A Redirection Request 78 (REDREQ) is generated when a call cannot be delivered to a roaming subscriber that does not answer or is already active in another call. If the home switch is an IS-41 Rev. A switch, then a Redirection Request 78 is sent from the host processor 11 to the home switch. FMR Plus provides special processing to allow home switches to comply with legal restrictions.

Location Request

A Location Request 80 (LOCREQ) is generated to determine the roaming subscriber associated with a temporary number that has a call to be delivered. This is a non-standard use of this message to support "reverse routing" for FMR support. See "Reverse Routing Request," earlier.

FMR I/O GATEWAY

Figure 15:
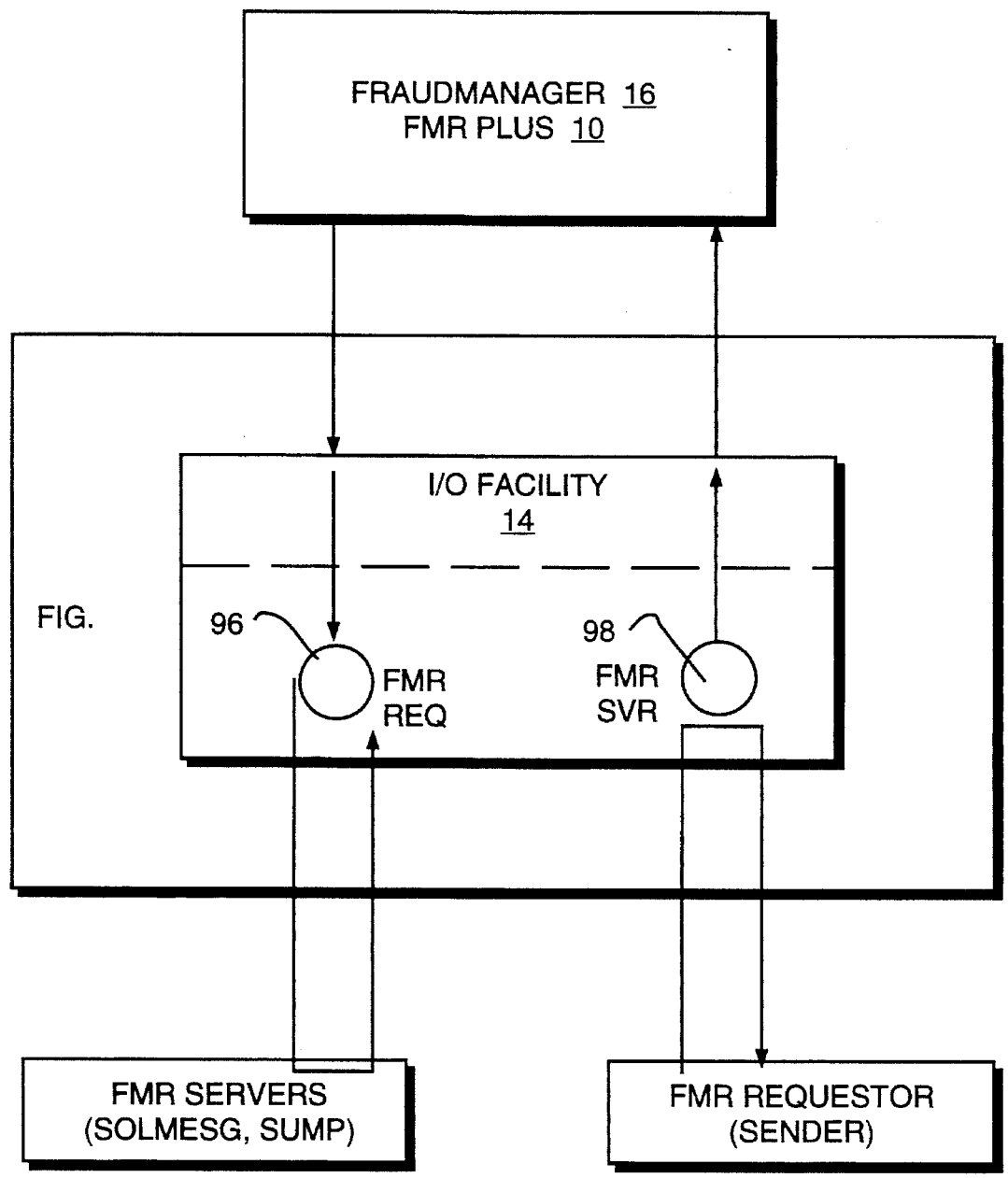
FIG. 15 is a block diagram of the interoperability gateway of the present invention.

Referring now to FIG. 15, the FMR I/O Gateway (FIG) 14 provides the means for exchanging Roamer Activation and Deactivation messaging data between the FraudManager/FMR Plus application and the Follow-Me-Roaming service running on older systems. The FMR I/O Gateway 14 operates as a bi-directional I/O facility to FraudManager/FMR Plus 10 Call Processor 12. Toward FMR, it operates as a Requestor 96, submitting FMR messages, and as a Server 98 relaying FMR messages. FIG. 15 depicts the three internal components of FIG. 14. This specification uses the same conventions as EIA/TIA IS-41 Revision A and GTE/EDS ICE Revision 0. Wherever Possible, IS-41 Revision A data elements and values are used. If no IS-41 Revision A data elements are available, ICE Revision 0 data elements and values will be used. Data elements needed by FIG. 14, which are not present in either IS-41 or ICE will be introduced and defined in this document.

Functional Descriptions

Each definition includes a brief description of the message used, and further explanatory notes as necessary. The following TCAP (Transaction Capabilities Application Part) encoding conventions apply to the IS-41 Call Processing interface to the FMR I/O Gateway 14:

1) The Package Type is Unidirectional.
2) Transaction Ids are not used.
3) The Component Type is Invoke Last.
4) Invoke Ids are not used.
5) The Operation Code Identifier is Private TCAP.
6) The Operation Code Family is GTE Internal FMR Gateway (Hex 77).
7) The Operation Code Specifier is encoded as follows:

| Family Name | Private Specifier | Abbreviation | Hex |
| --- | --- | --- | --- |
| GTE Internal FMR Gateway | Identify Roaming CSS | ID-ROAM | 01 |
| GTE Internal FMR Gateway | Enable Home Forwarding | ENABHOME | 02 |
| GTE Internal FMR Gateway | Setup TLDN | SET-TLDN | 03 |
| GTE Internal FMR Gateway | Confirm Forwarding Enabled | CONFENAB | 04 |
| GTE Internal FMR Gateway | Confirm TLDN Setup | CONF-SET | 05 |
| GTE Internal FMR Gateway | Report Status | REP-STAT | 06 |
| GTE Internal FMR Gateway | Identify Deactivating CSS | ID-DEACT | 07 |
| GTE Internal FMR Gateway | Disable Home Forwarding | DISABHOME | 08 |
| GTE Internal FMR Gateway | Teardown TLDN | TEARTLDN | 09 |
| GTE Internal FMR Gateway | Confirm Forwarding Disabled | CONF-DIS | 0A |
| GTE Internal FMR Gateway | Confirm TLDN Teardown | CONFTEAR | 0B |
| GTE Internal FMR Gateway | Register Roaming CSS | REG-ROAM | 0C |
| GTE Internal FMR Gateway | Confirm Registration | CONF-REG | 0D |

No Response Package Types are allowed, therefore, no Return Result, Return Error or Reject components are used in the Gateway 14 Interface.

FIG. 14 Message Descriptions and Procedures

Identify Roaming CSS. This message is sent from IS-41 Call Processing 12 to the FMR I/O Gateway 14 when a roaming CSS is detected in an IS-41 supported serving switch. Detection consists of the receipt of a Remote Feature Control Request 74. This message is translated into an FMR message type 181.

Register Roaming CSS. This message is sent from the FMR I/O Gateway 14 to IS-41 Call Processing 12 to validate a roaming CSS. If the home MSC for the roaming CSS is IS-41 Rev. A capable 36, Call Processing will verify the feature capabilities required to proceed with call delivery activation. This message is translated from an FMR message type 172/372. A type 172 denotes a CSS Mode of 'active', and 372 denotes 'passive'. This message is only used by FMR to request FMR Plus to validate the Roaming CSS and, if possible, determine whether the CSS is permitted to terminate calls or not and whether the switch will deliver calls or not.

Confirm Registration. This message is sent from IS-41 to the FMR I/O Gateway 14 when a roaming CSS has been successfully validated. If it's Home MSC is IS-41 Rev. A capable, this message also denotes successful registration and verification of feature capabilities. This message is translated to an FMR message type 174/374. A CSS Mode of 'active' denotes a message type 174 and 'passive' denotes 374. The MSCId is reflected from the Registration request 60 message. This message is only used by FMR Plus to notify FMR that a roaming CSS has been validated and, if possible, verified for call delivery.

Setup TLDN. This message is sent from the FMR I/O Gateway 14 to IS-41 when a roaming CSS needs to be activated in it's serving MSC with a specific Temporary Local Directory Number (TLDN). This message is translated from an FMR message type 183. This message is only used by FMR to notify FMR Plus that a specific TLDN has been assigned to a roaming CSS when FMR Plus provides access to the visiting MSC.

Confirm TLDN Setup. This message is sent from IS-41 to the FMR I/O Gateway 14 when a roaming CSS has been activated in it's serving MSC with a specific Temporary Local Directory Number (TLDN). This message is translated to an FMR message type 185. This message is only used by FMR Plus to notify FMR that a specific TLDN has been assigned to a roaming CSS when FMR Plus provides access to the visiting MSC.

Enable Home Forwarding. This message is sent from the FMR I/O Gateway 14 to IS-41 when a roaming CSS needs to be activated in it's Home MSC with a specific Temporary Local Directory Number (TLDN) associated with the Serving MSC. This message is translated from an FMR message type 182/382. A type 182 denotes a CSS Mode of 'active' and 382 denotes 'passive'. This message is only used by FMR to notify FMR Plus that a specific TLDN has been assigned to a roaming CSS when FMR Plus provides access to the Home MSC.

Confirm Forwarding Enabled. This message is sent from IS-41 to the FMR I/O Gateway 14 when a roaming CSS has been activated in it's Home MSC with a specific Temporary Local Directory Number (TLDN). This message is translated to an FMR message type 184/384. A CSS Mode of 'active' denotes a message type 184 and 'passive' denotes a type 384. This message is only used by FMR Plus to notify FMR that a specific TLDN has been assigned to a roaming CSS when FMR Plus provides access to the home MSC.

Identify Deactivating CSS. This message is sent from IS-41 Call Processing to the FMR I/O Gateway 14 when a roaming CSS requests or requires deactivation to/from an IS-41 supported switch. Deactivation consists of the receipt of a Remote Feature Control Request where *19 are the dialed digits, or a directive disallows call delivery, termination or authorization, or the CSS has been cancelled. This message is translated into an FMR message type 191/391. CSS Mode is set 'active' only when a Remote Feature Control Request initiates the deactivation. All other causes are 'passive'. A CSS Mode of 'active' denotes an FMR message type of 191 and 'passive' denotes a type 391. If CSS Mode is 'active', then Digits (Dialed) is required. This message is only used by FMR Plus to notify FMR that a specific CSS has either requested deactivation or deactivation is required.

Disable Home Forwarding. This message is sent from the FMR I/O Gateway 14 to IS-41 when a roaming CSS needs to be deactivated in it's Home MSC by removing the specific Temporary Local Directory Number (TLDN) associated with the Serving MSC. This message is translated from an FMR message type 192/392. A type 192 denotes a CSS Mode of 'active' or 'Passive' and 392 denotes 'passive' only. An FMR message type 192 contains a PIC field which is used to determine 'active' or passive'. When the PIC field is blank (space filled), 'passive' is intended. When the PIC contains a "*19", a CSS Mode of 'active' is intended. For other PIC values, 'passive' is the default CSS Mode. This message is only used by FMR to notify FMR Plus that a specific CSS/TLDN association should be removed. This message is sent when FMR Plus provides access to the Home MSC.

Confirm Forwarding Disabled. This message is sent from IS-41 to the FMR I/O Gateway 14 when a roaming CSS has been deactivated in it's Home MSC. This message is translated to an FMR message type 194/394. A CSS Mode of 'active' denotes a 194 and 'passive' denotes a message type 394. This message is only used by FMR Plus to notify FMR that a specific CSS/TLDN association has been removed. This message is used when FMR Plus provides access to the home MSC.

Teardown TLDN. This message is sent from the FMR I/O Gateway 14 to IS-41 when a roaming CSS needs to be deactivated in it's Serving MSC by disassociating the specific Temporary Local Directory Number (TLDN). This message is translated from an FMR message type 193/393. A type 193 denotes a CSS Mode of 'active' and 393 denotes 'passive'. This message is only used by FMR to notify FMR Plus that a specific CSS/TLDN Association should be removed. This message is sent when FMR Plus provides access to the visiting MSC.

Confirm TLDN Teardown. This message is sent from IS-41 to the FMR I/O Gateway 14 when a roaming CSS has been activated in it's Serving MSC. This message is translated to an FMR message type 195/395. A CSS Mode of 'active' denotes a message type 195 and 'passive' denotes type 395. This message is only used by FMR Plus to notify FMR that a specific CSS/TLDN association has been removed. This message is used when FMR Plus provides access to the visiting MSC.

Report Status. This message is sent from IS-41 to the FMR I/O Gateway 14 when a requested operation cannot be completed successfully. This message is translated to an FMR message type 188. This message is only used by FMR Plus to notify FMR that a operation (for a specific MINI/ESN) cannot be completed.

Implementation Notes

Several changes are required within FMR to accomplish the FMR Plus/Follow Me Roaming interface. The following list describes the changes required:

1) The FMR messages must be capable of supporting MSC Ids in place of FMR's internal Switch Ids. This will require:
   a) An MSC Id to Switch Id table and associated maintenance facilities;
   b) Modifications to SOLMESG to identify messages with MSC Ids instead of Switch Ids;
   c) Possible changes to the SUMP server and RFMRSEND requestor to handle MSC Ids.

2) FMR Plus processing will need to know when an overt action (CSS dials *18/*19) has caused activation or deactivation. Overt actions use the 100 series messages, autonomous events use the 300 series messages. Refer to CSS Mode for more information.

3) FMR Plus Processing needs to be informed of every *19 that is sent by a CSS for which FMR Plus represents the home switch.

4) A modification is required of RFMRSEND to perform a SEND operation to FIG. 14 for message delivery in place of establishing an X0.25 connection and packetizing messages for delivery.

5) FMR Switch Id value '8888' identifies a FIG. 14 originated/destined message.

FIG. 14 Interface to FMR Plus

FIG. 14 interfaces to FMR Plus Call Processor 12 on the host processor 11 SCP through the SCP's Message Transport Services (MTS). FIG. 14 is an Endpoint identified in the Endpoint Table. Messages are sent to FIG. 14 in the same manner in which messages are sent to any other I/O Facility, namely, MTS^Send. Messages are always placed on FIG. 14's reply queue, hence FIG. 14 uses L^MTS^Reply^Get to dequeue messages from Call Processor 12. Messages submitted to Call Processor 12 conform to the construction appropriate to an I/O Facility. Messages are composed of three structures:

1) Interprocess Message Header (IMH)
2) Signalling Connection Control Part (SCCP)
3) Transaction Capability Application Part (TCAP)

FIG. 14 uses L^^MTS^TCAP^Queue to enqueue a message to Call Processor 12. FIG 14 requires several assignments and parameters in order to interface with FMR Plus. As a minimum, FIG. 14 requires the following:

| | |
|---|---|
| 1) EndPoint Id | FIG. 14 needs to be informed of its own endpoint identity in order to specify the calling party address in the SCCP header. FMR Plus Call Processor 12 will also require specific knowledge of FIG. 14's endpoint identity. |
| 2) EndPoint File | FIG. 14 must be able to acquire its endpoint details from the EndPoint File. |
| 3) FMR Plus's SSN | FIG. 14 Requires FMR Plus Call Processor 12's SubSystem Number (SSN) under which it is registered with the host processor 11 SCP. Since all Call Processor 12 must use the well known Task Id of 40, the SSN will be used to determine the specific server class associated with FMR Plus Call Processor 12. |

FIG. 14 as an FMR Requestor

FIG. 14 operates as an FMR message receiver (RFMR-RECV) 96. An FMR message receiver receives and validates incoming messages and delivers the messages to the SOLMESG server. Also, it generates requests to the SUMP server upon direction from SOLMESG. FIG. 14 will use the PathSend facility to address the Pathway Servers on FMR. Messages sent to the SOLMESG server will have transaction protection with TMF. Unsuccessful transactions will be backed out and retried up to <$Sr_1$>times. Messages sent to SUMP do not have transaction protection. Unsuccessful delivery will be retried up to <$Sr_2$>times. TMF transactions and PathSends will be performed in a nowaited fashion so that other events (FMR Plus I/O, other Requestor Operations, and Server operations) can be handled as they occur.

FIG. 14 requires several parameters in order to function as an FMR message receiver as follows:

1) PathMon Process contains the full network name of the PathMon for FMR. This is required in order to establish the correct access paths to the necessary serverclasses.

2) SOLMESG Serverclass contains the logical serverclass name of the SOLMESG server as defined in the FMR Pathway configuration.

3) SUMP Serverclass contains the logical serverclass name of the SUMP server as defined in the FMR Pathway configuration.

4) SOLMESG Timeout contains the number of seconds that FIG. 14 should allow for a response from the SOLMESG server prior to invoking its retry logic.

5) SUMP Timeout contains the number of seconds that FIG. 14 should allow for a response from the SUMP server prior to invoking its retry logic.

6) SOLMESG Retry <$Sr_1$> contains the number of times a failed message delivery to the SOLMESG server will be retried.

7) SUMPRetry <$Sr_2$> contains the number of times a failed message delivery to the SUMP server will be retried.

FIG. 14 as an FMR Server

FIG. 14 will function as an FMR Server 98 in its role as a 'site processor'. As an FMR server, it can be directly addressed from all RFMRSEND requestors. Therefore, the RFMRSEND requestor needs to be changed to accommodate sending outbound messages to a server instead of an X0.25 SVC connected PC. As an FMR Server, FIG. 14 will maintain an outstanding read on $Receive, process any incoming message which should result in the submission of a TCAP message to FMR Plus Call Processor 12 and reply (ACK or NACK) to the original message. Since enqueuing TCAP messages to Call Processor 12 is not a waited operation, FIG. 14 can receive a server message, enqueue the TCAP and reply immediately. Since the TCAP messages are unidirectional, no response from Call Processor 12 is expected (or possible). Therefore, the reply to the original message can be returned without any wait states or resource allocations in the messages processing path. FIG. 14 does not require any parameters or assignments to operate as an FMR server process.

FIG. 14 TCAP to FMR Messages

FIG. 14 provides translation services between the TCAP messages described previously and the FMR messages described in the Data Element Description section of the Follow Me Roaming® System Overview Manual. The following table describes the field by field format used to construct both the FMR messages from the TCAP parameters or the TCAP parameters from the FMR messages.

| FMR Message Field | Format | TCAP Parameter | Format |
|---|---|---|---|
| Electronic-Serial-Number | 8 ASCII hex digits | Electronic Serial No. | 32-bit binary |
| Mobil-Identification | 10 ASCII dec digits | Mobile Identification No. | 5 byte BCD |
| Dial-Digits | 32 ASCII character | Digits (dialed) | n byte TBCD |
| Switch-Id | 4 ASCII dec digits | No Equivalent: always 8888 | |
| PC-Timestamp | 14 ASCII dec digits | Status TimeStamp | 32-bit binary |
| Elapsed-Time | 6 ASCII dec digits | No Equivalent: computed | |
| Temporary-Directory Num. | 10 ASCII dec digits | Digits (Routing) | n byte TBCD |
| Misc-Param-String | 30 ASCII character | No Equivalent: spaces | |
| P-Len | 9 ASCII dec digits | No Equivalent: zeros | |
| Subscriber-Info | 60 ASCII character | No Equivalent: spaces | |

-continued

| FMR Message Field | Format | TCAP Parameter | Format |
|---|---|---|---|
| Status-Code | 4 ASCII dec digits | FIG. 14 Status | 8-bit binary |

We claim:

1. An enhanced call delivery system, Follow Me Roaming Plus (FMR Plus), for delivering telephone calls to a roaming cellular subscriber, enabling said subscriber to receive calls placed to his MIN in his home system service area, said enhanced system having seamless interoperability with call delivery systems which do not participate in said enhanced call delivery system, comprising:

a central telecommunications system processor capable of handling network applications for said enhanced call delivery system;

a plurality of mobile telephone switches located in the service areas of a plurality of cellular telephone systems which participate in said enhanced call delivery system, each of said mobile telephone switches connected via a direct communications link to said central telecommunications system processor;

a plurality of registers in said central telecommunications system processor for storing data bases of system information, individual switch information, and subscriber information, said registers including:

a general location register in said central telecommunications system processor, said general location register containing a data base of all information necessary for validation of known roamers, whereby validation and registration is accomplished without reference to the home switch;

a home location register within said general location register containing a data base of all information necessary for communication with all cellular switches of all cellular providers in said network;

a visiting location register within said general location register containing a data base of all information necessary for communication with all roaming cellular subscribers registered in said system;

a data base of routing information for location of home carriers in said general location register, whereby end-to-end validation and registration can be accomplished for previously unknown roamers;

an Input/Output Gateway (FIG) to and from said central telecommunications system processor for translation of messages and inter-system communication with the host processor of cellular systems which participate in a second call delivery system, Follow Me Roaming (FMR), having a subset of the features of said enhanced system;

at least one intersystem gateway to and from said central telecommunications system processor for translation of messages and inter-system communication with cellular systems which participate in at least one third call delivery system;

means to enable said central telecommunications system processor of said enhanced call delivery system to communicate with each of said switches of said enhanced system, and through said gateways to the central processors of said second and third call delivery systems, and through said central processors to individual switches of said second and third call delivery systems, to provide to the switches of the home and visited service areas of a roaming cellular subscriber:

(1) the identity of the current visited system switch of a roaming cellular subscriber known to his home system;

(2) the financial responsibility of the roaming cellular subscriber;

(3) a valid roamer service profile in said visited system; and (4) call delivery to a validated roaming cellular subscriber in the service area of said visited switch.

2. The system of claim 1 wherein said means to communicate with each of said switches in each of said call delivery systems comprises:

a database having information about each switch in each call delivery system, including the type of switch, which messages are supported by said switch, how each switch handles messages;

a set of Mobile Application Part (MAP) messages to control transaction flow processing within said enhanced call delivery system, and between said enhanced call delivery system and said second and third call delivery systems;

means to interpret each of said MAP messages and to discover its origin and destination; and means to encode/decode messages to/from said second and third call delivery systems through said gateways;

whereby said enhanced call delivery system communicates seamlessly with said second and third call delivery systems.

3. A method for enhanced call delivery, for delivering telephone calls to a roaming cellular subscriber, enabling said subscriber to receive calls placed to his MIN in his home system service area, having seamless interoperability with call delivery systems which do not participate in an enhanced call delivery system, comprising:

connecting a plurality of mobile telephone switches located in the service areas of a plurality of cellular telephone systems which participate in an enhanced call delivery system, via a direct communications link to a central telecommunications system processor;

storing in said central telecommunications system processor for storing data bases of system information, individual switch information, and subscriber information;

storing a data base of routing information for location of home carriers in a general location register in said database, whereby end-to-end validation and registration can accomplished for previously unknown roamers;

providing an Input/Output Gateway to and from said central telecommunications system processor for translation of messages and intersystem communication with the host processor of cellular systems which participate in a second call delivery system, having a subset of the features of said enhanced system;

providing at least one intersystem gateway to and from said central telecommunications system processor for translation of messages and intersystem communication with cellular systems which participate in at least one third call delivery system;

enabling said central telecommunications system processor of said enhanced call delivery system to communicate with each of said switches of said enhanced system, and through said gateways to the central processors of said second and third call delivery systems, and through said central processors to individual switches of said second and third call delivery systems, to provide to the switches of the home and visited service areas of a roaming cellular subscriber:
- (1) the identity of the current visited system switch of a roaming cellular subscriber known to his home system;
- (2) the financial responsibility of the roaming cellular subscriber;
- (3) a valid roamer service profile in said visited system; and
- (4) call delivery to a validated roaming cellular subscriber in the service area of said visited switch.

4. The system of claim 3 wherein the step of enabling said central telecommunications system processor of said enhanced call delivery system to communicate with each switch in each call delivery system further comprises:

storing a database having information about each switch in each call delivery system, including the type of switch, which messages are supported by said switch, how each switch handles messages;

providing a set of Mobile Application Part (MAP) messages to control transaction flow processing within said enhanced call delivery system, and between said enhanced call delivery system and said second and third call delivery systems;

interpreting each of said MAP messages to discover its origin and destination; and encoding/decoding messages to/from said second and third call delivery systems through said gateways;

whereby said enhanced call delivery system communicates seamlessly with said second and third call delivery systems.

\* \* \* \* \*